US006834276B1

(12) United States Patent
Jensen et al.

(10) Patent No.: US 6,834,276 B1
(45) Date of Patent: Dec. 21, 2004

(54) DATABASE SYSTEM AND METHOD FOR DATA ACQUISITION AND PERUSAL

(75) Inventors: Robert Leland Jensen, San Antonio, TX (US); Daniel Victor Smith, San Antonio, TX (US)

(73) Assignee: Integrated Data Control, Inc., San Antonio, TX (US)

( * ) Notice: Subject to any disclaimer, the term of this patent is extended or adjusted under 35 U.S.C. 154(b) by 0 days.

(21) Appl. No.: 09/257,714

(22) Filed: Feb. 25, 1999

(51) Int. Cl.[7] ............................ G06F 17/30; G06F 7/00
(52) U.S. Cl. ................................ 707/2; 707/6; 707/10; 707/102; 715/501.1; 715/513; 709/217
(58) Field of Search .................... 707/1–7, 10, 513, 707/501, 102, 104; 709/217, 219

(56) References Cited

U.S. PATENT DOCUMENTS

| | | | | |
|---|---|---|---|---|
| 4,955,056 A | * | 9/1990 | Stentiford | 704/239 |
| 5,544,352 A | * | 8/1996 | Egger | 707/5 |
| 5,678,041 A | * | 10/1997 | Baker et al. | 707/9 |
| 5,822,539 A | * | 10/1998 | van Hoff | 709/236 |
| 5,832,494 A | * | 11/1998 | Egger et al. | 707/102 |
| 5,832,499 A | * | 11/1998 | Gustman | 707/103 |
| 5,842,206 A | * | 11/1998 | Sotomayor | 707/5 |
| 5,875,441 A | * | 2/1999 | Nakatsuyama | 707/1 |
| 5,889,958 A | * | 3/1999 | Willins | 709/229 |
| 5,890,172 A | * | 3/1999 | Borman et al. | 707/501 |
| 5,895,461 A | * | 4/1999 | De La Huerga et al. | 707/1 |
| 5,920,859 A | * | 7/1999 | Li | 707/5 |
| 5,924,090 A | * | 7/1999 | Krellenstein | 707/5 |
| 5,961,602 A | * | 10/1999 | Thompson et al. | 709/229 |
| 5,987,454 A | * | 11/1999 | Hobbs | 707/4 |
| 6,012,053 A | * | 1/2000 | Pant et al. | 707/3 |
| 6,038,668 A | * | 3/2000 | Chipman et al. | 713/201 |
| 6,092,074 A | * | 7/2000 | Rodkin et al. | 707/102 |
| 6,092,080 A | * | 7/2000 | Gustman | 707/103 |
| 6,098,064 A | * | 8/2000 | Pirolli et al. | 707/2 |
| 6,101,492 A | * | 8/2000 | Jacquemin et al. | 707/3 |

(List continued on next page.)

OTHER PUBLICATIONS

Rus, D. and Subramanian, D. "Information Retrieval, Information Structure, and Information Agents", in "Intelligent Hypertext:Advanced Techniques for the World Wide Web", Nicholas, C. and Mayfield, J., eds., Berlin:Springer–Verlag, 1997, pp. 145–182.*

(List continued on next page.)

Primary Examiner—Luke S Wassum
(74) Attorney, Agent, or Firm—Charles W. Hanor, P.C.

(57) ABSTRACT

A data acquisition and perusal system and method including a database selection module, a database index generator module and a search module. The database selection module enables selection of a plurality of files for inclusion into at least one selectable database. The database index generator module enables generation of a searchable index of the data contained in the selectable database. The search module enables a search to be performed of the searchable index according to search criteria. The data acquisition and perusal system and method may also allow users to view, acquire, and generate single- or multiple-data sources locally or remotely, and allow users to compile, index, modify, and append the data sources according to default or user defined criteria. The data acquisition and perusal system and method may also selectively acquire and display data contained within remote databases depending upon the user's access permissions to such databases. Such a system allows for the capture of hypertext data which is automatically indexed without human intervention and has the ability to automatically and accurately locate or "pinpoint," and highlight specific text or groups of text designated by the user within the resulting database. Such a system contains a link module that enables custom links to be defined between selected terms of selected files of the selectable database including the custom links so that the searchable index includes only valid links.

15 Claims, 18 Drawing Sheets

U.S. PATENT DOCUMENTS

| | | | | |
|---|---|---|---|---|
| 6,112,203 A | * | 8/2000 | Bharat et al. | 707/5 |
| 6,122,647 A | * | 9/2000 | Horowitz et al. | 715/513 |
| 6,134,584 A | * | 10/2000 | Chang et al. | 709/219 |
| 6,138,113 A | * | 10/2000 | Dean et al. | 707/2 |
| 6,163,779 A | * | 12/2000 | Mantha et al. | 707/100 |
| 6,199,060 B1 | * | 3/2001 | Gustman | 707/3 |
| 6,212,527 B1 | * | 4/2001 | Gustman | 707/102 |
| 6,247,018 B1 | * | 6/2001 | Rheaume | 707/102 |
| 6,272,534 B1 | * | 8/2001 | Guha | 709/216 |
| 6,292,894 B1 | * | 9/2001 | Chipman et al. | 713/168 |

OTHER PUBLICATIONS

Hastings, B. "WebEx: Download Now, Hyperbrowse Later", PC World, vol. 14, No. 10, Oct. 1996, p. 98.*

Bethoney, H. "Save it for Later with WebClip; Offline Browser Eases Organization of Downloaded Pages", PC Week, vol. 13, No. 33, Aug. 19, 1996, p. N3.*

Wang, W. and Rada, R. "Experiences with Semantic Net Based Hypermedia", International Journal of Human–Computer Studies, vol. 43, No. 3, 1995, pp. 419–439.*

Ellis, D. et al. "On the Measurement of Inter–Linker Consistency and Retrieval Effectiveness in Hypertext Databases", Proceedings of the $17^{th}$ Annual Int'l ACM–SIGIR Conference on Research and Development in Information Retrieval, Aug. 1994, pp. 51–60.*

Zheng, M., and Rada, R. "Text–Hypertext Mutual Conversion and Hypertext Interchange through SGML", Proceedings of the $2^{nd}$ International Conference on Information and Knowledge Management, Nov. 1993, pp. 139–147.*

Rada, R. "Converting a Textbook to Hypertext", ACM Transactions on Information Systems, vol. 10, No. 3, Jul. 1992, pp. 294–315.*

Coombs, J.H. "Hypertext, Full Text, and Automatic Linking", Proceedings of the $13^{th}$ International Conference on research and Development in Information Retrieval, Dec. 1989, pp. 83–98.*

Duncan, T. and McKell, M. "Making Network Information Accessible with FolioViews 4.11", Novell NetNotes, Apr. 1998, pp. 79 82.*

Mendelson, E. "Off–Line Browsers", in The 1997 Utility Guide, PC Magazine, vol. 16, No. 7, Apr. 8, 1997, pp. 207–218.*

Haskin, D. "Taming the Net", Computer Shopper, vol. 16, No. 12, Dec. 1996, pp. 576–583.*

Folio Corporation, "Folio announces new IomegaReady software version of Folio Web Retriever is now available", press release, Dec. 5, 1996.*

Folio Corporation, "Folio Views 4.0: Getting Started", Oct. 25, 1996. QA76.755.F65 1996.*

Heck, M. "Web Retriever Converts Sites into Editable Databases", InfoWorld, Oct. 7, 1996, p. IW4.*

Seybold Publications Inc., "Editorial Aid—The Offline Browser", Seybold Report on Desktop Publishing, vol. 10, No. 11, Jul. 8, 1996.*

Folio Corporation, "Folio Corporation announces Folio Web Retriever 2.0", press release, Jun. 17, 1996.*

Bethoney, H. "Folio Views Creates Info Databases", PC Week, vol. 11, No. 44, Nov. 7, 1994, p. 129.*

Folio Corporation, "Folio Views 3.1 Infobase Management Software: Infobase Production Kit Version 3.1", Chapter 6, pp. 117–142, Sep. 8, 1994. QA76.755.F655 1994.*

Folio Corporation, "Folio Views 2.1 Infobase Users Guide", Jun. 1991. QA76.7555.F65 1991.*

Sheryl Canter, Folio Web Retriever, PC Magazine "The 1997 Utility Guide", 1997, Ziff–Davis Inc., New York, NY.

* cited by examiner

DATABASE SYSTEM AND METHOD FOR DATA ACQUISITION AND PERUSAL

FIELD OF THE INVENTION

The present invention relates generally to a data acquisition and perusal system and method for locating, indexing, and accessing information, and more particularly to a data acquisition and perusal system and method for acquiring, creating, manipulating, indexing, and perusing data, and to a method and system for locating and retrieving known or unknown data for the same purposes.

BACKGROUND OF THE INVENTION

Computers were intended to provide an effective and efficient way for humans to manage, locate, peruse and manipulate data or objects. For example, a first, basic system and method is that demonstrated by modern word processor applications which have some search and text access capabilities; however, as far as is known, they are limited to the current file that is open. Employing this method, the user can request the location of a word in the text. Within an individual file, the computer will then take the user sequentially to each location of that text. Only string searches are allowed. By repeatedly running the search, the user can sequentially move from result to result. While it might be possible to open, many files simultaneously, the available resources and memory make this impractical.

A second, improved system and method enabled by some computer operating systems include applications that allow users to search all available files, accessible by certain software applications, for words or simple phrases. They still require the user to open each of the files of interest in a word processor, viewer or other application referred to in the first system and method to access the data. The search time required is relatively great because the data available has to be sequentially read and compared with the query.

A third system and method used by software applications provides improved search capabilities and is commonly known as a "search/retrieval engine". Among other things, search/retrieval engines can essentially search and access many thousands of files simultaneously and very quickly by using pre-generated indexes of the data. For example, a user can query an encyclopedia converted to an indexed database, and by the use of highlighted text, quickly determine every place a word or phrase occurs in the text, and have the ability to instantly view those occurrences as desired. These products even take the user sequentially to each incident of highlighted text or "hit." The computer can then take the user from hit to hit.

Converting a database like an encyclopedia into a format useable by a search/retrieval engine is not simply a matter of converting its volumes into electronic files accessible by the user's computer. For efficient search performance, the contents of the files are logically indexed as to location, frequency, etc. The search functions of the engine actually search the index to determine if the query criteria are met, and then the locations of valid results are passed to the retrieval functions to display them. Without a well-designed index, a computer could take a long time to perform a search for a simple phrase that can otherwise be performed in a fraction of a second. Some search/retrieval engine application vendors allow users to generate indexes for their own files through an indexing utility, and others intend for indexing to be done only by electronic database publishers by use of a separate application designed for that purpose.

Currently, a user desiring to employ the speed of a computer to search for and retrieve data from multiple disparate source files generally has three choices: (1) use the basic first system and method above to open each file in a word processor application and search them individually; (2) use the second system and method above, search each file using an operating system application, and then open each file in the list of results in a word processor application; and (3) obtain an indexed database of the sources along with a search/retrieval engine from an electronic publisher, or create a database usable by a search/retrieval engine.

As far as is known, no application has been devised, however, to adequately deal with the internet and yield the results described in the third system and method above. The internet is a vast and burgeoning source of information concerning nearly every subject. But the internet is comprised of files available in SGML and its derivatives including HTML and XML and other hypertext type formats. A hypertext markup language such as HTML is a structured, yet ambiguous language. In this application, reference is generally made to HTML files and documents, which is the most common format. However, it is understood that this includes the SGML format and its other derivatives, including XML and future modifications, implementations, and standards for use in data files, databases and the internet. As far as is known, having a computer automatically and accurately determine the exact location of text within an HTML type formatted document, object, or file is not accomplished in the prior art. Consequently, there is no known practical method or system whereby a user can efficiently and effectively use a computer's speed to search for and retrieve data from a set of files accessible by the computer and get pinpoint, highlighted display of the designated text. It should be noted that the information desired may be in files, objects, or files that are unknown, and available to the user. In addition to the internet, many enterprises have extensive repositories of information stored in electronic form that may contain information an authorized user may desire and want to locate and access. Even at the lowest level, an individual computer generally contains unknown or forgotten data that the user would find valuable. All of these repositories of information cannot be as efficiently accessed by the current art as is desired.

Using the current art in the third system and method above, users can add electronic bookmarks to enable them to quickly return to any part of any volume of an encyclopedia, referred to in the example above, and they can copy portions for insertion into other documents of their own creation. By use of hypertext links appearing within the database, a user is able to instantly view related data for which he had not searched. The links are generated according to a rationale applied when the database index was prepared. Adding hypertext links usable within a database is generally a more complex process. The links are intended to appear to the user in a color or format distinguishable from other data, and when activated, the computer is directed to display another highlighted portion of the database. By naming the instructions to the computer within links as "pointers" and what they link to as "targets", the process will be facilitated. A database can theoretically have an unlimited number of identical pointers (even though what the user sees can be different for some or all of them), but any pointer can generally only have one target (a specific area of the database to display), and targets are invisible to the user. Links must be sensitive to the context of the document and context sensitivity requires intelligence. Thus, adding links to a database requires human intervention because current computers inherently lack any intelligence. Although simple linking based upon discernible patterns within text and targeted toward files matching those patterns can easily be done programmatically, human intervention is still required to design and initiate the process. Further, such favorable linking circumstances rarely exist within typical, disparate data and even greater human intervention is required. Consequently, search/retrieval engine vendors essentially leave linking up to the creator of the search engine software or electronic publisher to do manually, and the links are generally not customizable by the user. Thus, the vendors commonly provide technical specifications on how to craft pointer and target codes for the software and how to write programs to link their unique databases. However, some word processing and other applications permit users to craft links among compatible files using manual processes.

If a user desires to have the searchable data include context-sensitive links, the choices are generally reduced to: (1) obtaining a pre-linked database from an electronic publisher; or (2) creating a custom database and manually inserting links individually or by use of a custom program written for the unique situation. Beyond the problems of availability and lack of customization, a fundamental problem with the first choice is that a publisher may not consider the same links to be important as a user does. Thus, the publisher may include links that are not important to the user and may not include links that would have been important. A fundamental problem with the second choice is that manually inserting links requires a substantial amount of time and trouble that quickly outweighs any potential benefit to manually inserting links as the quantity of data increases. As far as is known, the current art does not include a system to create links by designating "pointers" and "targets" and having the program automatically create links that are all valid.

It would be highly beneficial to have the results from computer searches of various sources of information that locate information from the various sources, to be quickly and easily saved locally for accessing at a later time, without having to redo the search and re-access the sources of information. This saves search time and repeating the search, which may not locate the previous information. The locally saved information can also be quickly accessed without having to relocate the information. An object of the invention is to allow someone to create his or her own custom, organized database that can be utilized effectively. Each time relevant information and files are located, they can be put into a database, indexed and made available for use.

The limitations of prior systems are overcome by the present invention, which is an improved method and system for acquiring, creating, manipulating, indexing, and perusing data, and for locating and retrieving known or unknown data for the same purposes. In a preferred embodiment, the system is a stand-alone application residing on a user's personal computer that enables the user to create fully searchable databases or local sources of any size from any electronic documents accessible by the computer and selected by the user. It also enables the user to accurately and methodically locate undiscovered documents that may be of interest. By use of a word processing means integrated into the application, it enables the user to create and include new documents into the database or to create retrievable documents within the application. Any databases or documents that the user creates can be password protected to restrict access by unauthorized users who may have access to the computer.

The invention provides a user with the ability to train a search engine to automatically and methodically search the internet or other data sources according to derived or evolved limitation criteria. Each set of such criteria is stored for reuse or modification as the user desires. Without limiting the criteria, the system could be directed to retrieve and completely index every file that existed on its available data sources. While that would guarantee that all data in those files would be searched for data that the user wants, there are practical limitations.

If the data source is vast, like the internet, the system would attempt to index all of its files, objects, or documents, but it would quickly encounter storage limitations on the user's computer if default limitations were not automatically imposed. By artfully estimating the time and storage requirements and matching them to available resources, the system guides the user to impose limitations to produce the desired results. This method allows users to completely index all of some data sources, to filter and sort smaller percentages of greater data sources, or to survey large data sources such as the internet. In the latter case, the user can refine the resultant survey to identify smaller, but more relevant, parts of the data sources. After sufficiently iterating the refinement process, the user will be able to index and search all selected and relevant data. Thus, this system and method enable a user to predictably and efficiently solve the problem of selecting and comprehensively searching relevant data from sources with unknown content by combining human intelligence with the indexing and search/retrieval capabilities of a computer. Since the system can be trained to repeat all or parts of previous actions, the user's instructions can be perfectly carried out while repeatedly using different search criteria.

Uses of the system include those identified herein as well as many others. For example, a vendor could prepare a database, kept on a remote server that contains continually updated information, to be accessed by a computer running this system. Among other things, the database could contain information authorizing the user to continue to use the system and query the database. Independent of the server, the user could then employ all or part of the system's capabilities for other purposes as desired.

In one embodiment, commercial electronic database publishers could use a system according to the present invention as a publishing system to create databases with more or less homogeneous content. For example, one publisher may produce a monthly searchable, linked database containing issued United States patents, another might produce a linked database containing decisions of appellate courts, and another might produce a linked database containing documents required to be filed by various regulatory agencies, etc. Using prior systems to produce such databases requires substantial programming skills to incorporate reference links within the database, but in practice, many such links are invalid because a referenced document does not exist. Using the system according to the present invention does not require such skills because it automatically creates only valid and verified links. The graphical user interface is easily modified to comport with a particular "look and feel" desired by the publisher.

In another embodiment, a data provider could maintain a continually updated database of information (e.g., statistical or a glossary) on a remote server that the user accesses via a network such as the internet. Upon being started by the user, an application automatically connects to the remote database when information from the database is needed and disconnects once it is obtained. If the remote database has changed, the user will be notified and the user's database index can be regenerated to accommodate the changes. By storing user authorization codes on the remote server in a database or table for that purpose, the provider can verify that the user is still entitled to access the service provided. The application on the user's computer can automatically be rendered dysfunctional by the passage of time unless it successfully renews its operating status by connecting to the provider's authorization code database. This embodiment provides advantages to both the data provider and the network service provider: (1) the system application can essentially be provided on a subscription or rental basis without the necessity of distribution media or elaborate license or copyright protection schemes; and (2) the network service provider's effective bandwidth is greatly increased because the system only connects to the remote server on an as-needed, when-needed basis instead of requiring an active modem connection continuously.

Another object of the invention is to provide a method and system for storing search results from various sources including the internet with internet format files, objects, or documents. The locally stored results can be automatically indexed for fast searching and hyper linked by the user to make subsequent finding of the previously located information quick and simple The system and method of the invention overcomes the above-noted problems of the prior art and can be used for general purpose data acquisition, creation, manipulation, indexing, and perusal while connecting to remote data sources only as needed.

SUMMARY OF THE INVENTION

A data acquisition and perusal system and method according to the present invention includes a database selection module, a link module, a database index generator module and a search module. The database selection module enables selection of a plurality of files, objects, or documents for inclusion into at least one selectable database. The link module enables custom links to be defined between selected terms of selected files of the selectable database. The database index generator module enables generation of a searchable index of the data contained in the selectable database including the custom links so that the searchable index includes only valid links. The search module enables a search to be performed of the searchable index according to a search criterion.

The plurality of different files may include a plurality of different file types, such as internet formatted files, objects, or documents, including HTML type formats, and word processor formats, text formats, RTF formats, etc. Generally, each database includes one or more files of a particular type. The database selection module may be configured to enable selection of the plurality of files both locally and remotely via a network. For example, the data acquisition and perusal system and method may be implemented on a computer coupled to a network, where the network may further be connected to the internet. The data acquisition and perusal system and method may be configured to copy internet files to a local storage disk, or to simply maintain a link to the internet files of interest.

The link module enables association of any selected link term with any of the plurality of files in the selectable database. The link module may further enable at least one alias term to be defined for any selected link term to enable a link to be established between each alias term and any of the files in the database. Each of the files may further include one or more fields. The link module further enables field links to be defined between any two or more of the plurality of files. Such field links may be defined according to patterns, where the patterns may further be defined using wildcard characters that each replace one or more digits or characters.

The search module may further enable sorting of any files of the selectable database that meet the search criterion. In one embodiment, such sorting may be according to the respective fields of the files. For example, the files may be sorted by date, by name, or by any other field types or descriptions.

The data acquisition and perusal system and method may further include at least one input device and a display utility including a graphic user interface (GUI). The input device and display utility enables graphic interaction with the database selection, the link, and the search modules via the input device. The display utility displays at least portions of files in the selectable database that meet the search criterion. The portion of a displayed file typically includes any text that meets the search criterion. Such text is usually graphically indicated, such as via color, style, highlighting, etc. Also, any selected link terms defined via the link module are also indicated in a similar manner. Further, the display utility enables interaction with any indicated selected link terms via the input device to enable perusal of linked files in the selectable database. For example, a user may double click on highlighted text indicating a link term in a displayed file, where the data acquisition and perusal system and method jumps to and displays the linked file. Operation is similar for alias link terms if defined.

The system and method may automatically, unambiguously, and accurately place reference links among documents within a database it creates according to a schema controlled by the user. These links enable the user to instantly view a file, object, or document referenced by another file, object, or document currently being viewed and to backtrack to any point of origin in the database. The system and method does not modify or make extraneous copies of the contents of the original database files, objects, or documents. If a file, object, or document is modified or deleted, the integrity of the database is not affected with respect to the other files, objects, or documents because either the database (i.e., the index) will be regenerated, or an error message will be presented telling the user that the file, object, or document has been modified or deleted. The application also may give the user the option to create compressed, password-protected databases for secure dissemination to other users or simply to secure the files, objects, or documents and database indexes for personal use.

Embodiments of a system and method, in accordance with the principles of the present invention, provide methods and systems for acquiring, creating, manipulating, indexing, and perusing data; for locating and retrieving known or unknown data for the same purposes; for automatically connecting to remote network computers on an as-needed, when-needed basis; for validating a user's rights to use the system; and for securing pertinent data from unauthorized use.

BRIEF DESCRIPTION OF THE DRAWINGS

A better understanding of the present system can be obtained when the following detailed description of the preferred embodiment is considered in conjunction with the following drawings, in which.

DETAILED DESCRIPTION OF THE PREFERRED EMBODIMENT

Figure 1A:
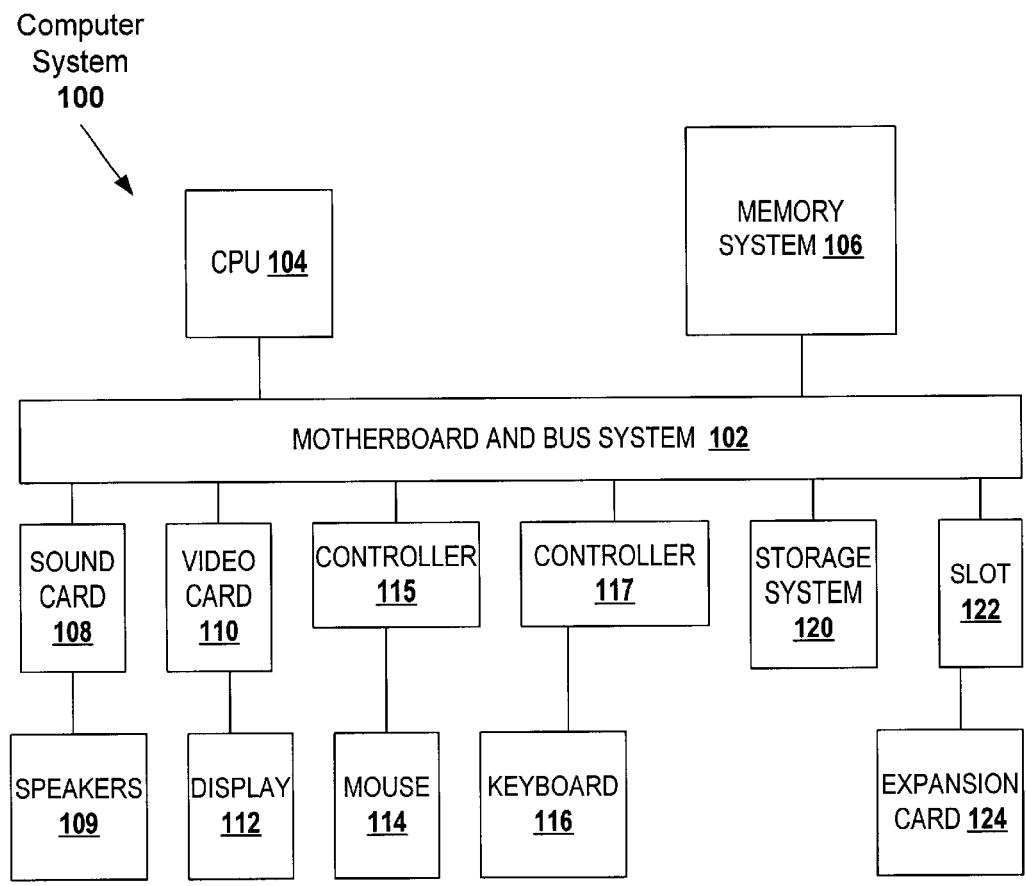
FIG. 1A is a block diagram of an exemplary computer system that is used to illustrate various aspects of the present invention.

Referring to the drawings, FIG. 1A is a block diagram an exemplary computer system 100 that could be used to illustrate various aspects of a data acquisition and perusal system implemented according to the present invention. The computer system 100 is preferably a conventional IBM brand compatible, personal computer (PC) system or the like, and includes a motherboard and bus system 102 coupled to at least one central processing unit (CPU) 104 and a memory system 106. The motherboard and bus system 102 include any kind of bus system configuration, such as any combination of a host bus, one or more peripheral component interconnect (PCI) buses, an industry standard architecture (ISA) bus, an extended ISA (EISA) bus, micro-channel architecture (MCA) bus, an AGP bus, a universal serial bus (USB), etc., along with corresponding bus driver circuitry and bridge interfaces, etc., as known to those skilled in the art. The CPU 104 preferably incorporates any one of several microprocessors, such as the 80486, Pentium™, Pentium II™, Pentium II™, etc. microprocessors from Intel Corp., or other similar type microprocessors such as the K6 microprocessor by Advanced Micro Devices, and supporting external circuitry typically used in PCs. The external circuitry preferably includes an external or level two (L2) cache or the like (not shown). The memory system 106 may include a memory controller or the like and be implemented with one or more memory boards (not shown) plugged into compatible memory slots on the motherboard, although any memory configuration is contemplated. The invention is also applicable to other microprocessors, other architectures and other operating systems.

The computer system 100 may include one or more output devices, such as speakers 109 coupled to the motherboard and bus system 102 via an appropriate sound card 108 and a monitor or display 112 coupled to the motherboard and bus system 102 via an appropriate video card 110. One or more input devices may also be provided such as a mouse 114 and a keyboard 116, each coupled to the motherboard and bus system 102 via appropriate controllers 115, 117, respectively, as known to those skilled in the art. A storage system 120 is coupled to the motherboard and bus system 102 and may include any one or more data storage devices, such as one or more disk drives including floppy and hard disk drives, one or more CD-ROMs, one or more tape drives, etc. Other input and output devices may also be included, as well as other types of input devices including a microphone, joystick, pointing device, voice recognition, etc. The input and output devices enable a user to interact with the computer system 100 for purposes of data acquisition and perusal, as further described below.

The motherboard and bus system 102 may be implemented with at least one expansion slot 122, which is configured to receive compatible adapter or controller cards configured for the particular slot and bus type. Typical devices configured as adapter cards include network interface cards (NICs), disk controllers such as an IDE or a SCSI (Small Computer System Interface) disk controller, video controllers, sound cards, etc. The computer system 100 may include one or more of several different types of buses and slots, such as PCI, ISA, EISA, MCA, AGP, USB, etc. Each slot 122 is configured to receive an expansion card 124, such as a sound card, a modem card, a network interface controller (NIC) or adapter, etc.

Other components, devices and circuitry are normally included in the computer system 100 but are conventional and are not part of the present invention and are not shown. Such other components, devices and circuitry are coupled to the motherboard and bus system 102, such as, for example, an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

A data acquisition and perusal system or application program according to the present invention may be stored in the storage system 120. The database application program is retrieved into the memory system 106 and executed by the CPU 104. As described more fully below, the database application program retrieves local files, such as stored in the storage system 120, and remote files, such as accessed via a network, and generates a searchable database index. Although reference is made in the specification and claims to computer files, it is understood that the term filed encompasses documents and any other digital object that contains machine or individual readable or searchable information. The searchable index may be generated in the memory system 106 or the storage system 120 for longer term storage. The database application program further includes search and retrieval functions that enable a user to search the searchable index as more fully described below. The computer system 100 is included to illustrate that a data acquisition and perusal system and method according to the present invention may be realized on a modern computing machine with a CPU, random access memory (RAM) and external storage, such as the storage system 120. The computer system 100 enables a user-friendly graphic user interface (GUI) implementation with display and input capabilities. There are no explicit restrictions on CPU architecture or display technology.

Figure 1B:
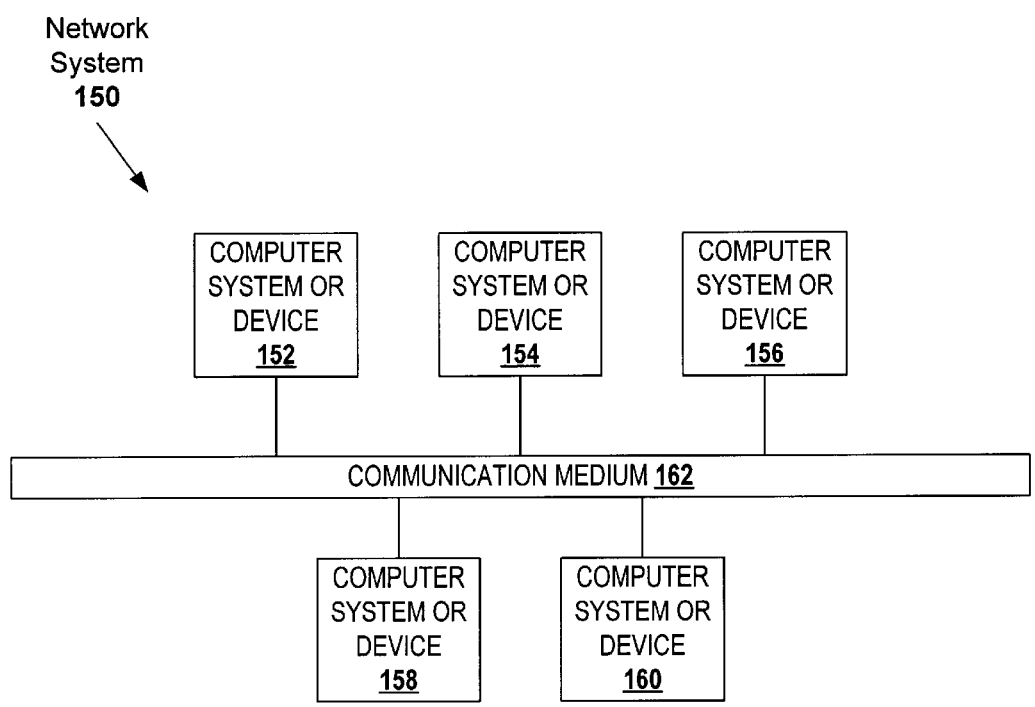
FIG. 1B is a block diagram of an exemplary network system that is used to illustrate various aspects of the present invention, where a computer is coupled to other computers in a network environment which also may be coupled to the internet.

Referring now to FIG. 1B, a block diagram is shown of a network system 150 that communicatively couples a plurality of computer systems or computing devices 152, 154, 156, 158, 160, etc. together via a communication medium 162. Any one or more of the computing devices 152–160 may be implemented in the same or a similar manner as the computer system 100. The network system 150 may include any one or more network devices (not shown), such as hubs, switches, repeaters, bridges, routers, brouters, etc. The network system 150 may operate according to any network architecture, such as Ethernet™, Token Ring, Token Bus, ATM, etc., or combinations of such architectures at any available speed, such as 10 Megabits per second (Mbps), 100 Mbps, 1 Gigabits per second (1 Gbps), etc. The network 150 may form any type of Local Area Network (LAN) or Wide Area Network (WAN), and may comprise an intranet and be connected to the internet.

The computer system 100 can operate a data acquisition and perusal system and method according to the present invention in a standalone mode. If coupled to a network, such as the network system 150, the computer system 100 can also access and retrieve remote files located on the networked computers 152–160. Of note, the communication medium 162 may be configured for an internet connection, an intranet connection, or other network connection. If the computer system 100 is coupled to the internet, to an intranet, or to another network via the connection medium 162, the computer system 100 can likewise access and retrieve files located through those connections. A system according to the present invention does not require that either original database source files or generated index files be located on the computer system 100.

Database source files (or documents) are typically divided into fields or areas when they are created. These fields may result from word processing application that is used to create the documents. For example, WordPerfect® formatted files/documents contain both hidden and visible fields in almost every document that is created. Likewise, Microsoft® Word (hereinafter MS-Word) formatted files/documents contain certain fields. In addition, internet or HTM (or HTML, HyperText Markup Language) type format files, objects or documents contain many hidden and unhidden fields. Thus, the files/documents/objects referred to herein should be understood to contain fields.

Further, a system according to the present invention includes special features for handling composite file types, such as HTML format files used over the internet. Composite files can include display codes for arrangement, graphics, fonts, hyperlinks, and other characteristics that allow "assembly" of what appears to be a single document presented on the computer monitor but which actually may be a compilation of multiple text and graphic elements stored in separate files. Unlike integral files, composite files are more efficient from a disk storage space standpoint than integral files because their reusable components, such as graphics, can be used many times by different files without having to be replicated for each file. Composite files can also include small integral programs called scripts (e.g., Java applets or Java scripts) that instruct the computer to perform other tasks while the HTML page is displayed. Regardless of the visual complexity of an HTML composite file, from a searchable database perspective, the crucial parts of the HTML composite file are those parts that contain text.

Figure 1C:
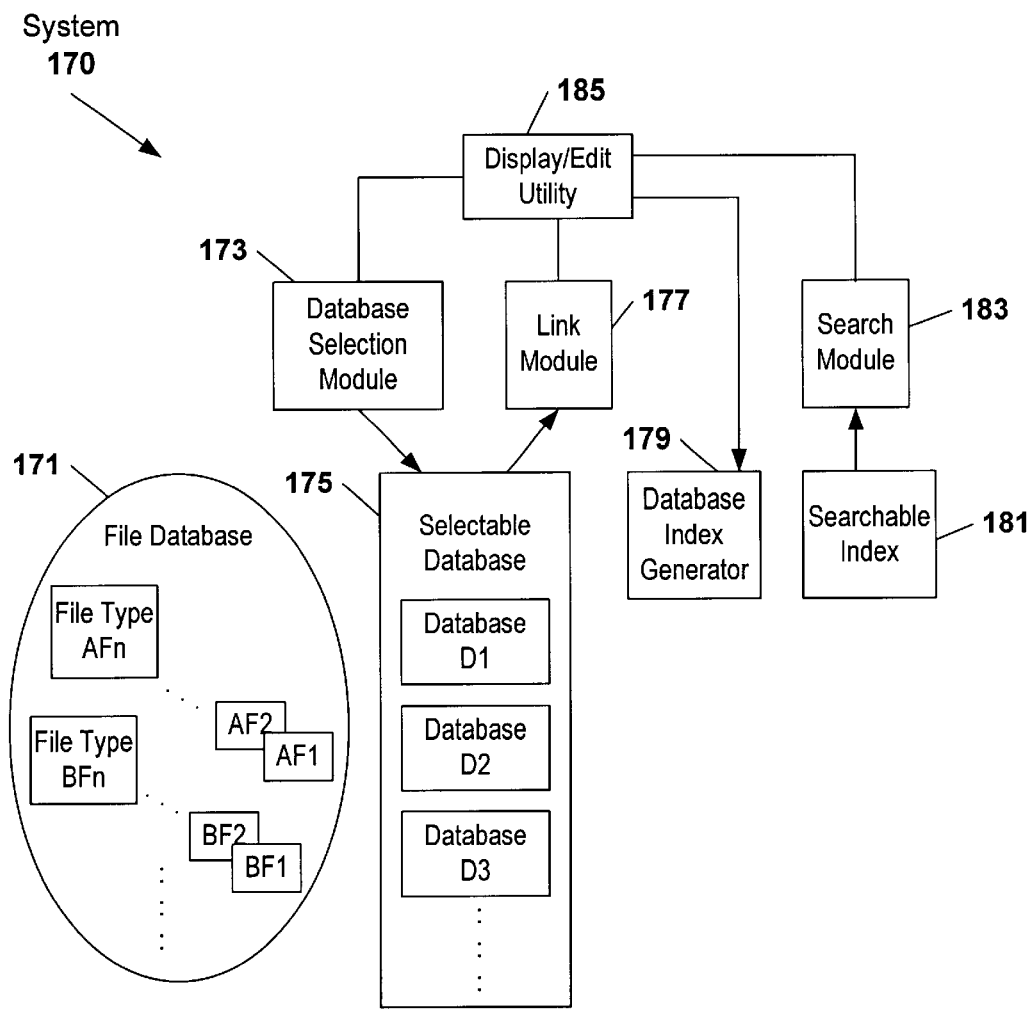
FIG. 1C is a block diagram illustrating a data acquisition and perusal system and method implemented according to the present invention.

FIG. 1C is a block diagram illustrating a system 170 implemented according to the present invention which performs the method of the invention. Although not limited to a single computer system, the present invention is illustrated using the computer system 100 as a standalone system as shown in FIG. 1A or as coupled to the network system 150 as shown in FIG. 1B. A file database 171 is shown in FIG. 1C which represents any file that is accessible, either locally or remotely, by the computer system 100. For example, the file database 171 may includes files located on the storage system 120 and files accessed from remote sources, such as via the internet, via the network system 150 and the expansion card 124 configured as a NIC or modem.

The file database 171 includes one or more files of type A, shown as files AF1, AF2 . . . AFn, where "n" is any positive integer. The file database 171 may further include one or more files of type B, shown as files BF1, BF2 . . . BFn, one or more files of type C (not shown), etc. Examples of file types include internet or HTML format (or simply HTM), word processor format including DOC files generated by MS-Word, or similar word processing files generated by WordPerfect®, text format, RTF (Rich Text Format) files, drawing files, database files, etc. The incompatibilities and between various formats has become less since several type of formats may be included in a single file, object, or document. In this manner, the present invention contemplates any number of files or documents of any type. It is noted that any one or more of the files may be copied into local storage or may be simply accessed via an existing link to that file. For example, in a default mode, internet files are copied locally. However, the user may choose to simply access the file via a valid link or address.

The system 170 shown in FIG. 1C includes a database selection module 173 that enables a user to select any number of any type of files from the file database 171 for inclusion into a selectable database 175. Of note, the term "module" represents any combination of hardware and software implemented to achieve the desired functions. For example, one or more modules described herein may be incorporated into a database application, which is stored on the storage system 120 and retrieved into the memory system 106 for execution by the CPU 104. The selectable database 175 comprises one or more databases, shown as D1, D2, D3, etc., where each database includes one or more files selected by the user from the file database 171. The selectable database 175 may include a single database with a single file or multiple files, or a plurality of databases, each including a single file or multiple files. The database selection module 173 enables the user to select and define the selectable database 175. For example the selectable database 175 may include a database D1 including files of a first type (AF1, AF2, etc.), a database D2 including files of a second type (BF1, BF2, etc.), and so on.

The system 170 may further include a link module 177 that enables a user to define one or more custom links between selected files of the selected database 175. Such links are typically referred to as hypertext links. For example, the user may choose one or more link terms that should be linked to at least one file, either in the same database or a different database, in the selectable database 175. The link module 177 allows an essentially unlimited number of such link term/file pairs to be created. As further described below, when a link term is encountered in a file or document, the link term is indicated or otherwise highlighted so that the user can select the indicated link term to jump to the linked file. The link module 177 may further enable the user to define one or more aliases for each link term. For example, the user may define the terms "grape", "tomato", "raspberry", etc., as aliases of a link term "vine fruit". Each alias is treated in a similar manner as its corresponding link term. Each of the files in the selected database 175 may further include one or more fields. The link module 177 enables the user to define field links to link similar fields between two or more files. Such field links may be generated according to patterns, where such patterns may further be defined using wildcard characters that each substitute for one or more digits or characters depending upon the function of the respective wildcards, as further described below.

The system 170 further includes a database index generator 179 that generates a searchable index 181 based at least on the selectable database 175. The database index generator 179 may further include the link information from the link module 177, so that the searchable index includes valid user-defined links. In this manner, the database index generator 179 is capable of processing the user-defined links in view of the selectable database 175 and incorporate only valid links into the searchable index 181. The system 170 further includes a search module 183 that enables the user to perform any number of searches of the searchable index 181 according to any desired search criterion. The search criterion may be according to any desired function or defined expression(s), such as a single term, literal phrases or terms comprising text in quotes, multiple words and Boolean operators (e.g. AND, OR, XOR, etc.), etc.

The system 170 may further include a display/input utility 185 that interfaces one or more of the modules of the system 170, such as the database selection module 173, the link module 177 and the search module 183. For the computer system 100, the display/input utility 185 may be implemented using the display devices such as the video card 110 and corresponding display 112, and input devices including the mouse 114 and mouse interface 115 and the keyboard 116 and the keyboard interface 116. Further, the display/input utility 185 includes one or more software programs or drivers executed from the memory system 106 by the CPU 104 to interface the respective modules. Such programs or drivers may be separate or integrated into a single application including the modules.

The display/input utility 185 preferably includes a GUI (Graphic User Interface) that enables the user to select and display one or more of the files of the file database 171, such as by pathname including directories and filenames or URL (Uniform Resource Locator) addresses, as well as one or more of the databases of the selectable database 175. The display/input utility 185 enables the user to interactively define link information via the link module 177. The display/input utility 185 enables the user to launch the database index generator 179 to generate the searchable index 181. The display/input utility 185 enables the user to define search criterion via the search module 183 and to view the results of a search. As described further below, the results may be viewed as a list of files that match the search criterion, and the user may select and view the contents any of the listed files. The display/input utility 185 displays portions of the files that match the search criterion, as well as any predefined links defined via the link module 177.

The system 170 shown in FIG. 1C is exemplary only and may include other modules and functionality. For example, the system 170 may include an integrated word processor dialog, one or more link generator dialogs, a search/retrieval dialog, a display options dialog, an integrate browser dialog, etc.

The system 170 provides several advantages over other types of search/retrieval applications or database programs. The system 170 enables a searchable index to be generated that includes valid, customized links. The searchable index provides a static and enables a snapshot of files or databases to be taken at a given time for perusal by a user at any time, even if the originating files change or are no longer valid. The searchable index is also dynamic in that the user may update the selected files and links and generate an updated index. The system 170 also enables pinpoint searches of multiple files at the same time, including multiple HTML files retrieved or accessed locally or via the internet.

Figure 2:
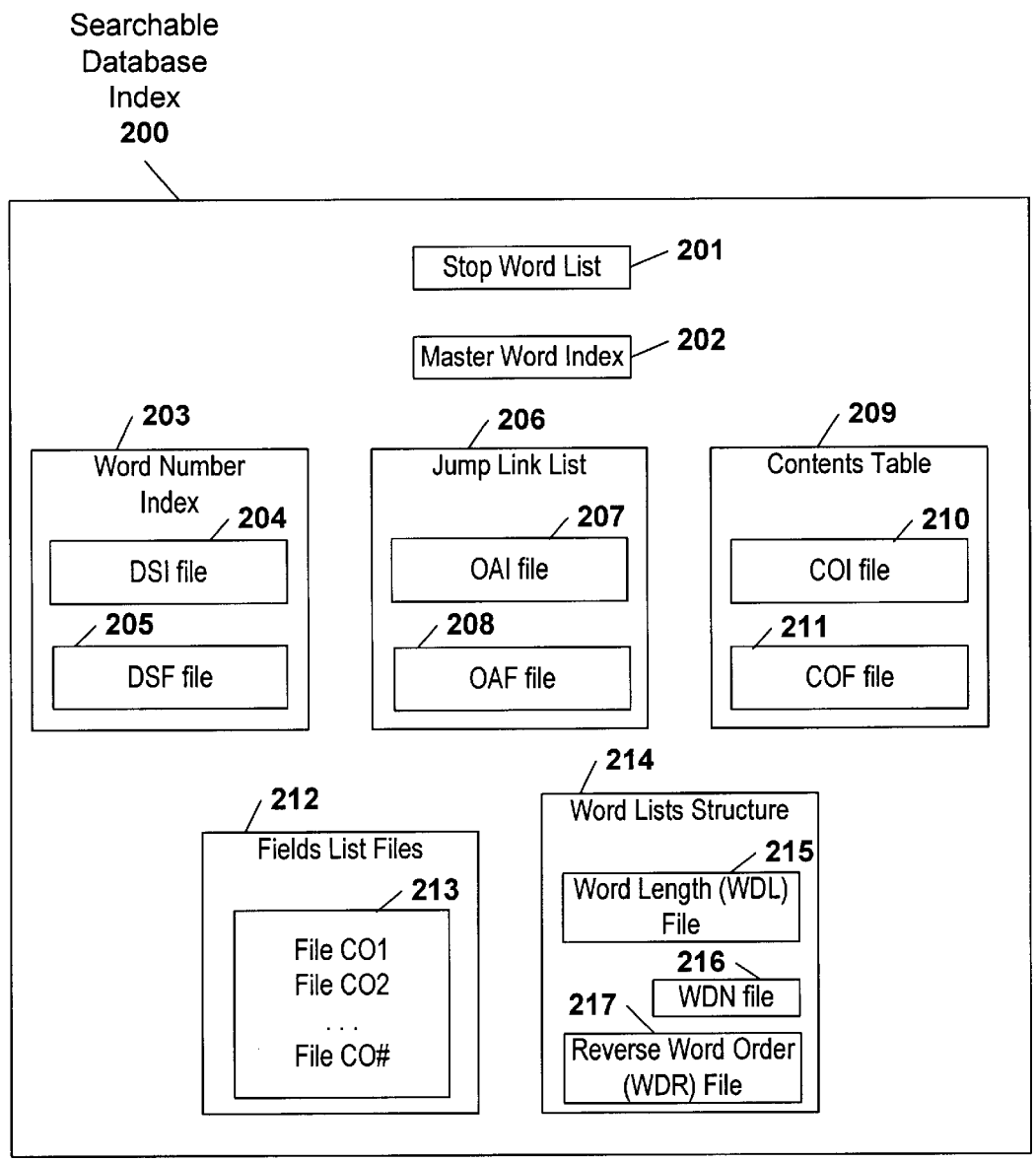
FIG. 2 is a block diagram of an exemplary searchable database index that is generated by the computer system of FIG. 1A.

FIG. 2 is a block diagram of an exemplary searchable database index 200 generated by a data acquisition and perusal system and method according to the present invention, such as the system 170. The database index 200 corresponds to, and is a more specific embodiment of, the searchable index 181 shown in FIG. 1C. The user makes an inquiry about specific words or phrases by entering those specific words or phrases via the search module 183. The search module 183 first parses the inquiry into a list of its discrete terms, i.e., words, numbers, spaces, etc., and then accesses the database index 200 to locate the terms in various files/documents of selected databases.

In operation, the search module 183 first compares each term of the search query against "words" contained in a stop word list 201 of the database index 200. The stop word list 201 is a file containing a list of "noise words", or words that frequently occur in a file/document that do not contain distinguishable characteristics. For example, stop words are "words" such as "and", "as", "the", "a", "I", "for", certain punctuation, etc. Although a default stop word list is provided for each database index that is to be generated, a user may edit the stop word list 201 for a particular database index that is to be generated and include additional stop words or remove unwanted stop words from the default stop word list. If a stop word is found among the terms of a It search query, the search for that term is terminated because the search module 183 considers that term to be a noise word and does not allocate further resources toward searching the files for that term. However, the length of the term is stored in the search engine's dynamic buffers for future phrase analysis. For example, if the search query contains the terms "big for tall", the word "for" is considered a stop word and a length of the stop word, i.e., five (three letters plus two white space delimiters), is stored in place of the spaces and the word "for". Thus, as described in greater detail herein, the search query becomes a search for files/documents that include the words "big" and "tall" with five spaces/characters between the words. If the search had been the search query "big as tall", where the word "as" is considered a noise word, the search query becomes a search for the words "big" and "tall" with four spaces/characters there between.

If a stop word is not found that corresponds to a term of a search query, the search module 183 then searches a master word index 202 for the term of the search query. The master word index 202, like the stop word list 201, is generated at the time the database index 200 is generated and is typically a binary file that includes a reference to each word, other than stop words, that appears in each of the files/documents of the database that is to be searched using the search module 183. Each word of the master word index 202 is associated with information regarding the word's length and regarding the files/documents in which the word appears.

The master word index 202 is best conceived as being a file made up of three parts which are referred to herein as Part 1, Part 2, and Part 3. Conceptually, Part 1 of the master word index 202 file is a list of segments, each segment corresponding to a file/document number. For example, segment number one corresponds with file/document number one, segment number two corresponds with file/document number two, etc. Further, each segment is actually a smaller list whose beginning and end points are known by Part 2 of the master word index 202 file. Of note, Part 1 of the master word index 202 file is written only if it is needed and thus only if there is more than one file in the database. In the case of a one file database, Part 1 is not written because it is not needed to distinguish one file from another.

Part 2 of the master word index 202 file, like Part 1, is a list of segments; however, each segment corresponds to each of the words in the database and is combined with information needed to find files/documents in which a given word appears in the database. Of course, if the database contains a single file, Part 2 becomes the first part of the master word index 202 file. In one embodiment, the standard segment of Part 2 is broken down thusly:

(a) First, a tagged binary string. Although the tag is arbitrary, in this embodiment, the tag is an ASCII 8, ASCII NULL pair, which tells the search module 183 that a word string follows. Following this pair is a two-byte binary coded integer representing the length of the word string. Following this integer is an ASCII representation of the word string.

(b) Following the tagged binary string is a sequence of twelve bytes comprised of three sets of four-byte integers or "long integers". Each long integer provides additional information necessary to find the word string in its database file(s). These twelve bytes are broken down thusly:

(i) the first four of the twelve bytes encode the word's word number as a long is integer.

(ii) the next eight of the twelve bytes encode two long integers whose interpretations depend upon one another.

The following Table I indicates possible values of the two long integers and their interpretation:

TABLE I

Long Integer Interpretation

| If first long integer (x) is: | And second long integer (y) is: | Interpretation: |
|---|---|---|
| Positive and less than the number of files in the database. | Positive. | First number (x) is the number of files in the database containing the word. Second number (y) is an index to the file position in Part 1 of the Master Word Index at which starts the list of file numbers containing this word. The list of numbers is x entries long. |
| Positive, and greater than the number of files in the database. | Positive | x indicates the number of files that DO NOT contain the given word. This number is determined by subtracting the number of files in the database from x. y is an index to the file position in Part 1 of the Master Word Index at which starts the list of the file numbers that do NOT contain this word. The length of this list is the number x, less the number of files in the database. |
| Positive | −1 | x is the file number of the one and only file in the database which contains this word. (No entry is needed in Part 1.) |
| −1 | −1 | All files in the database contain this word. (No entry is needed in Part 1.) |

The information contained in Part 2 of the master word index 202 enables the search module 183 to expedite searching procedures for any search query that may be entered into the search module 183.

Part 3 is a sequence of three indices, herein referred to as a first index, a second index, and a third index, for eliminating search terms that do not appear in Part 2 of the master word index file. Essentially, once a database index has been generated, the search module 183 uses Part 3 as a "negative search" index, i.e., an index to quickly eliminate search terms that do not appear in the database. In one embodiment, before the first of these three indices, there is a two-byte ASCII 5, ASCII NULL pair that serves as a dividing point between Parts 2 and 3.

The first index of Part 3 is a numeric index which consists of 110 long integers. The first ten long integers are indices into the Part 2 information for words starting with "0"–"9". Thus, when the database index 200 is generated, offsets for the words starting with "0"–"9" in the Part 2 data are recorded in each of the first ten long integers. If no word in Part 2 starts with the given single digit, four ASCII 255's are written into the corresponding long integer of the first ten long integers. Following these ten long integers are 100 long integers for words starting with the pairs "00"–"99". Similar to the first ten long integers, offsets for words in the Part 2 data are recorded, but if no word starts with the given pair, four ASCII 255's are written to that long integer of the first index.

The second index is an index for "odd" leading characters. This index is a list of 255 long integers, corresponding to ANSI characters 1–255. Like the first index, offsets for words in the Part 2 data are recorded, but if no word in Part 2 starts with a given character, four ASCII 255's are written to the corresponding long integer of the second index. Also, if the given character is a letter, a numeric digit, or any other character that a user is not intended to find with the search module 183, four ASCII 255's are written to the long integer that represents that character.

The third index is a list of long integers that index words with alphabetical leading characters. The third index is of variable length depending on whether the index is a (two or a three dimensional index (to be described herein). The first 26 long integers in the third index are offsets for words in the Part 2 data that begin with the single letters "a" through "z". If no words in Part 2 begin with a given letter, four ASCII 255's are written to the corresponding long integer. The next 676 (26 squared) long integers of the third index are offsets for words that begin with the pairs "aa", "ab", "ac", etc., through "zz", thus, creating a "two dimensional" index from the third index. Offsets for these words in the Part 2 data are recorded in the 676 long integers, but if no word begins with a given pair, four ASCII 255's are written to the corresponding long integer. If desired, the third index can be a "three dimensional" index, i.e., an index including references to single alpha characters (26), pairs of alpha characters (676), and three alpha characters. If the index is three dimensional, then 26 cubed (17576) long integers follow "zz". These long integers index words beginning with the triplets "aaa", "aab", "aac", etc., through "zzz". Again, if no word begins with a given triplet, four ASCII 255's are written to the corresponding long integer for that triplet.

Following these three indices is a nine byte string. The string begins with a single character that is ASCII 2 if the third index is two dimensional, and ASCII 3 if the third index is three dimensional. Following this character is a long integer corresponding to the offset at which the Part 2 data begins, i.e. the first character following the Part 1 data, if there is any Part 1 data. The last four bytes are a long integer corresponding to the first byte that follows the last byte of the Part 2 data. This is the offset for the ASCII 5 in the ASCII 5, ASCII NULL pair that tags the beginning of At the three indices of Part 3. Because the size of the three indices of Part 3 can be computed exactly based on the known dimensions of the alpha locator string as coded in byte 1 of this 9 byte string, this final four-byte long integer is not strictly necessary.

After the search module 183 determines which files contain the search terms, a word number index 203 is accessed to find the exact location of the search terms in each file of the database. The word number index 203 is included in the database index 200 and can be described by two files, a DSI file 204, and a DSF file 205. The terms "DSI" and "DSF" are somewhat arbitrary character strings and are commonly used as file extensions for the respective files in the word number index 203. Broadly speaking, the terms represent a file (DSF) and an index (DSI) to that file, but for purposes of understanding, each term is referred to as a file from a portion of the database index 200. It should be noted that, in a similar manner, the remaining portions of the database index 200 are also designated with similar character strings to designate files included in the respective portions of the database index 200.

The word number index 203 is used by the search module 183 to find the character and slot positions of words in database files. A character position is defined as the number of the logical byte or character in a file at which a word starts. For text files this is straightforward. For RTF, DOC (MS-Word), and HTM files, a translation from the actual binary file as stored on the disk to the logical file is necessary. A slot position is defined as the numeric position of the word in the file, a "word" being defined as any contiguous unit of text, including stop words, that appears between white space. Hence, for a file whose sole contents is the string "Have a nice day!", the word "nice" has a character position of 7 because the count starts at 0, where 'H' is at position 0. In addition, the word "nice" has a slot position of 3 because the count starts at 1, where "Have" is at position 1.

As stated, the DSI file 204 is an index into the DSF file 205 and contains a list of indices. This list contains a sequence of long integer pairs, encoded as eight bytes, for each file in the database. For a file which contains searchable words and has an entry in the DSF file 205, the first long integer in a DSI long integer pair is a start position in the DSF file 205 of information relating to that file and the second long integer in the pair is an end position of the information in the DSF file 205. For a file which contains no searchable words such as an HTM file that is simply a frame container, or a nonsense file that is filled with stop words only, each long integer of the long integer pair has a value less than 0, indicating that no DSF entry exists for the particular file.

Figure 2A:
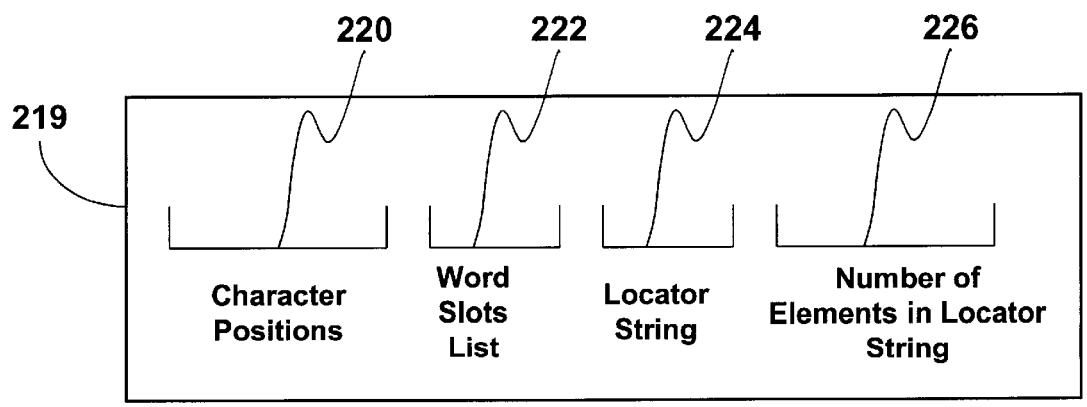
FIG. 2A is a schematic of an exemplary word position table as contained in a DSF file of FIG. 2.

With reference to FIG. 2A, the DSF file 205 for a database index 200 contains a sequence of word position tables 219 for each file in the database that contains searchable terms. Of note, some files of the database may be without searchable terms and, thus, not included in the DSF file 205. As stated, examples of files without searchable terms might include HTM pages that describe frame containers only, and thus have no searchable data of their own, or nonsense files which contain only stop lot words. The beginning and end of each word position table 219 in the DSF file 205 is coded in the companion DSI file 204. For each file which has a word position table 219, the table 219 is laid out in columns as shown by a single row view.

The first column of the word position table 219 includes character positions 220. The character positions 220 comprise variable length binary strings containing a sequence of long integers indicating character positions at which a given word appears in the file for which the word position table 219 was generated. In the second column of the word position table 219, a word slots list 222 is provided which is another variable length binary string containing another sequence of long integers, each indicating a slot position at which given words in the file appear. The correspondence between the character positions 220, the word slots 222 and their associated words is recorded in a locator string 224, i.e., the third column of the file's word position table 219.

Figure 2B:
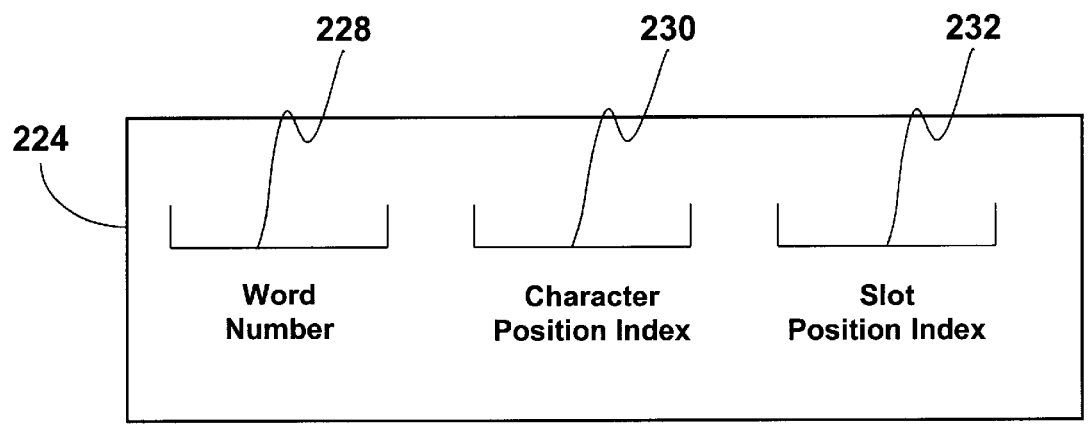
FIG. 2B is a schematic of an exemplary locator string from the word position table of FIG. 2A.

In this embodiment, the locator string 224 is a variable length binary string containing a sequence of twelve-byte sub-segments, each sub-segment coding three long integers. As illustrated in FIG. 2B, each twelve-byte sub-segment of the locator string 224 begins with a word number 228. The word number 228 is followed by a character position index 230 which is an index into the first column of the word position table 219 and indicates the location of the long integer that represents the position of the first character of the word in the file. This character position index 230 is followed by a slot position index 232 which is an index into the second column of the word position table 219, the word slots list 222, and indicates the location of the long integer that represents the position of the word in the file.

Referring to FIG. 2A, a number of elements in locator string 226 comprises the fourth and last column in the word position table 219. The number of elements in locator string 226 is a long integer and stores the number of sub-segments in the locator string 224.

Referring back to FIG. 2, a WDN file 216 is shown that represents a streamlined master word index 202 and contains data that is loaded into WDN maps, which are used for word searches on primary databases. These searches are typically faster than direct searches of the master word index 202 because the WDN file 216 is commonly loaded directly into the memory 106 of the computer system 100. Of course, compared to accessing the hard disk storage system 120 of the computer system 100, the memory 106 provides faster access for the search module 183. However, the memory 106 is limited in size and, thus, the size of the WDN file 216 may be limited.

In this embodiment, the data in the WDN file 216 consists of segments, one segment per each word in the database, where each segment consists of 52 bytes. The first 40 bytes contain the string representation of a given search word (e.g. "apple"). This string is padded on the right with spaces, so that it is always 40 bytes long, thus allowing easier loading into the word map. The next twelve bytes precisely duplicate the data in the three long integers stored in Part 2 of the master word index 202. In other words, the first long integer of the twelve bytes encode the word's word number. The next eight bytes encode two long integers, whose interpretations depend upon one another. Refer to Table I for possible interpretations.

For file/document organization, the database index 200 also includes a contents table 209 to assist the search module 183 to organize files/documents for display when a search has completed. In this embodiment, the contents table 209 includes two files, a COI file 210 and a COF file 211. The contents table 209 operates in conjunction with fields list files 212. The COI file 210 is an index into the COF file 211. The COI file 210 contains a sequence of four-byte binary encoded long integers, one long integer for each file in the database. These long integers encode a start position in the COF file 211 at which information for the given file begins. For example, to find the field information for the thirteenth file in a twenty-file database, the software of the computer system 100 retrieves the thirteenth long integer encoded in the COI file 210. The system 100 retrieves the fourteenth long integer encoded in the COI file 210 to determine where the fourteenth file's information begins and the thirteenth file's information ends in the COF file 211. Using these two values, the system 100 then extracts the characters from the COF file 211 and thus obtains all the field information for file thirteen of the database. Of course, for file twenty in this example, the system 100 simply reads the twentieth long integer in the COI file 210 to find the start position 1D for the information in the COF file 211. Since no file follows the last file, the end position for the information is simply the end of the COF file 211.

The COF file 211 contains the field information for each file in the database. Although each file in a given database has the same number of fields, though a particular file may have several blank fields, it should be noted that different databases may have different numbers of fields for the files in their databases. For example, HTM databases typically have fewer fields per file than databases containing MS-Word documents. Field information for a particular file is tab delimited. In the embodiment shown, characters are not used to delimit the field information for one file from the field information for another file. Instead, the last text character of field information for one file is immediately followed by the first character of field information for the next file.

When performing a search of a database, search results for a database may be ordered based on a number of different file fields taken from the fields list files 212, including title and date fields. The fields list files 212 aid in determining a proper sort order for files based on different fields. These different files are designated C01, C02, . . . CO# Files 213. Each of these files 213 is a list of four-byte binary encoded long integers. The long integers correspond to the numbers of each file in the database. The file numbers are presented in the order in which those files should be presented so that the files are sorted according to the given field order. For example, in a four-file database where field 1 is a title field and the files in the database are as follows:

File 1—TITLE: "Warthogs Eat Wooly Worms"
File 2—TITLE: "Canaries Crave Caraway Seeds"
File 3—TITLE: "Aardvarks Ate Ants"
File 4—TITLE: "Dogs Dine on Dairy Dumplings";

the CO1 file contains the file numbers 3, 2, 4, 1 bin that order, because the alphabetical sort order for these files by title is Aardvarks (file 3), then Canaries (file 2), then Dogs (file 4), then Warthogs (file 1). In this example, the CO2 file is based on a date field in the files so that the file numbers are in a different order based on date. Thus, the files 213 each contain a presorted list of file numbers that assist the search module 183 to organize the files found in a search based on a selected field.

Referring to FIG. 2, the WDN file 216 is part of a word lists structure 214. The word lists structure 214 includes files that contain different organizations of information associated with the words from the selected databases, the files being available to expedite the search of the database index 200 for the terms of a search phrase. In this embodiment, the word lists structure 214 includes a word length (WDL) file 215 that comprises an index of words according to their length, a reverse word order (WDR) file 217 that comprises an index of words spelled in reverse order (i.e., right to left order) and that are alphabetized according to the reverse spelling of the words, and the WDN file 216. Thus, the word lists structure 214 is useful when a search query includes terms such as leading conflation searches, i.e., searches that call for all words meeting a search criteria in which only the last few letters of the search term are required to be met in the search query. For example, a search for "*ample" creates a hit for the words "sample", "example", "ample", etc.

In this embodiment, if the search term is not found in the WDN file 216, the search for that term is terminated because the files/documents of the selected databases do not contain the term of the search query. If the search term is found in the WDN file 216, the exact location of additional information about the term stored in the master word index 202 is provided to the search module 183. If the computer does not have enough memory 106 to store the WDN file 216 in a memory map, the master word index 202 is searched directly for all information about the word, thus bypassing the WDN file 216 of the database index 200. In one embodiment, WDN files 216 of three databases are stored in memory 106, if possible, because users frequently select three or less databases to search and, typically, three or less WDN files 216 do not overly burden the memory 106 of a computer system operating the search module 183.

Of note, the search module 183 must still perform more tasks before displaying the documents that fit the search conditions, and these tasks are not necessarily related to any specific search. Any document displayed also exhibits any hypertext jump links tying it to other files in the database to which it belongs. When the database is indexed to generate the index files, a jump link list 206 is also generated. It contains an OAI file 207 comprising an index into an OAF file 208, which contains expansive data about hypertext links that exist in the database files.

To assist in the understanding of the database index 200, the following narrative of a search for the word "unique" from the perspective of FIG. 2 is offered. In this example, a database index is created for each of three databases. One database includes three HTM files, a second database includes three RTF files, and a third database includes four DOC files. In each of the databases, the word "unique" appears twice in one document and once in another document. Therefore, upon a search for the word "unique", each database has two files with at least one hit, one file with two hits and one file with one hit. The user selects the three databases and generates database indexes. The user presses "Enter" in the search dialog, requesting a search of the selected databases for the word "unique". The search module 183 determines that there are three databases selected, and all are primary databases. Because they are primary databases, the corresponding WDN files 216 are loaded into memory 106. Starting with database 1 (the HTM database), the search module 183 searches the HTM WDN file for the word "unique". The return value indicates that "unique" exists in this database, has a given word number (e.g., 138), and has two associated numeric values. In this case, the two values might be 4 and 68. The interpretation of the numeric values is carried out according to the interpretations described in Table I, where x=4 and y=68.

Because the HTM database is a three-file database, and x is 4, then row 2 of Table I applies, i.e., x (or 4) minus the number of files (3) equals one. Thus, one file does NOT contain the word "unique", but the other files do. The file number of the single file that does not contain the word "unique" may be found at position y=68 in the master word index 202. The search module 183 next looks in the master word index 202 at position 68 and reads one four-byte binary encoded long integer, whose value is 1. This is interpreted to mean that files 2 and 3 in this database contain the word "unique". Thus, all the files in the first database that contain the word "unique" are known. The search module 183 next performs a search on the second RTF database with similar results, perhaps finding that "unique" was word number 122 and files 1 and 3 contain the word "unique".

This is followed by a check of the third database, i.e., the four-file MS-Word DOC database, where the word number is 190 and the numeric values are x=6 and y=156. Again, according to Table I, the return values indicate that two (6−4=2) of the four files in the database do not contain the word "unique", and those two files are recorded at position 156 of the master word index file 202. Reading the two four-byte binary encoded long integers at position 156 in the master word index 202 indicates that files 1 and 2 do not contain the word "unique", and thus files 3 and 4 do contain the word "unique". Thus, at this point, the user knows that each of the three databases has two as files that contain the word "unique". These files include Files 2 and 3 of Database 1, Files 1 and 3 of Database 2 and Files 3 and 4 of Database 3.

With this information in hand, the next step of the search module 183 is to display the titles and other appropriate fields of the found files in the dialog, in the sort order specified by the user. In this example, assume that the user is sorting by document title and that the document title corresponds to field number four.

First, the search module 183 reorders its file number hits list to correspond to the final display selected by the user. Initially, the file number order may be represented as the following ordered pairs (database number, file number): (1,2), (1,3), (2,1), (2,3), (3,3) and (3,4). The search module 183 begins by loading the full contents of the first database's CO4 file (213, member of 212), since ordering is by field number four. A comparison of the ordered contents of the CO4 file to the two "hit" file numbers for database 1 indicates that file 3 should be displayed before file 2. This process is repeated for databases 2 and 3, resulting in a final sorted list of: (1,3), (1,2), (2,1), (2,3), (3,4), (3,3).

Now that the search module 183 has sorted the complete hits list, the numeric pairs are translated to field list strings 212. The search module 183 begins by looking in the COI file 210 of Database 1's contents table 209. In this example, the COI file 210 indicates that the field information for file 3 begins at position 112. Further, because 112 is the third and final number stored in the COI file 210, and the total file length for the COF file 211 is 172, the field information for file 3 ends at position 172. Reading the data in the COF file 211 from position 112 to 172, the search module 183 gives the fields for the file, including a file name (field one) of "1 uniq.htm", a title field (field four) of "Unique appears only once", and a closing date field, with blank fields in between. The search module 183 sorts these fields and composes a string in which field four is presented first, followed by the database name, followed by a number of other mostly blank fields (excluding the file name), and concluding with the file date. This string is output to the display. A similar process is carried out for each file hit, allowing a total of six field strings to be output to the dialog display 112.

At this point, it is up to the user to select a file to view. If the user selects the third file in the list, which would be the first file of database 2, the dialog is closed and file 1 of database 2 starts to open. During the opening process, OAI and OAF files 207 and 208 for database 2 are checked to see if any string ranges in the RTF file need to be highlighted and treated as jump links. In this case, no jump links exist in the file. Also during the opening process, the word number index 203 for database 2 is used to determine the character ranges in file 1 of database 2 that are to be highlighted and treated as search terms located in the file.

The first step in using the word number index 203 occurs when the search module 183 opens the DSI and DSF files 204 and 205 for database 2. The DSI file 204 is a binary file listing pairs of long integers, each long integer coded as a four-byte binary number. Every file in a database has a corresponding pair of long integers in the DSI file 204, listed in file number order. Hence, file 1 corresponds to the first pair of long integers in the DSI file 204, and the last file in the database corresponds to the last pair of long integers in the DSI file 204. If both long integers are positive in value, then they are interpreted as beginning and ending indices into the DSF file 204, indicating the start and end of a word position table 219 describing a database file. If both long integers are less than 0, then the DSF file 205 contains no entry for this file.

In the case of file 1, a DSF 205 entry exists, so the first two long integers in the DSI file 204 indicate the beginning and ending ranges for this entry in the DSF file 205. The search module 183 temporarily extracts this segment into main memory 106 and examines it. The layout of information in this segment is determined by first examining the last four bytes of this segment, and translating it into a number. The number is the number of elements in the segment's locator string 224, which immediately precedes the last four bytes of the segment. The search module 183 knows that each locator string 224 entry is twelve bytes long, and thus the locator string 224 is 1200 bytes long if the number of elements is 100. The search module 183 then examines the first entry in the locator string 224. This entry, as is true of all the entries, codes three long integers in its twelve bytes. The first four bytes code the word number 228 for the first indexed word in the file. For example, the file may begin with the word "Zebra" and end with the word "aardvark", but since "aardvark" lexically precedes "Zebra", "aardvark" is considered the first indexed word in the file. The second four bytes indicate the 100 character position index 230 information for this first word, which should be 0, indicating the beginning of this DSF 205 segment. The third set of four bytes indicates the start of the slot position index 232 information for this first word, which will thus be the position in this DSF 205 segment at which the word slots list 222 information begins. Thus, the DSF 205 segment has been divided into four parts, including the character positions 220 addressed by the second byte of each locator string 224; the word slots list 222 addressed by the third byte of each locator string 224; the locator string 224, in this case containing 100 twelve-byte segments; and the number of elements in locator string 226, in this case 100.

As stated earlier, if the word number for "unique" in database 2 is 122, the locator string 224 is searched for an entry whose word number portion is 122. Once this locator string 224 entry is found, the second long integer in the locator string 224 is read and interpreted, for example, a value of 68. Following this, the next locator string 224 entry is read and interpreted, for example, a value of 76. Thus, the eight bytes starting at 68 and ending at 76 in this segment indicate the starting positions for the word "unique" in file 1. Since these bytes are interpreted as four-byte long integers, this indicates that "unique" occurs twice in file 1. For example, the first long integer could indicate that "unique" begins at character position 100 and the second long integer could indicate another instance beginning at character position 200.

With this information, plus the knowledge that "unique" is six characters long, the search module 183 is able to identify character positions 100 to 106 and 200 to 206 of by file 1 in database 2 as the location of the two instances of the search term in this file. These text ranges are indicated through operations such as highlighting, and the file is finally displayed for the user. Of course, the search module 183 treats the character positions in the remaining files in a similar fashion for indicating or highlighting the terms for a user.

Figure 3:
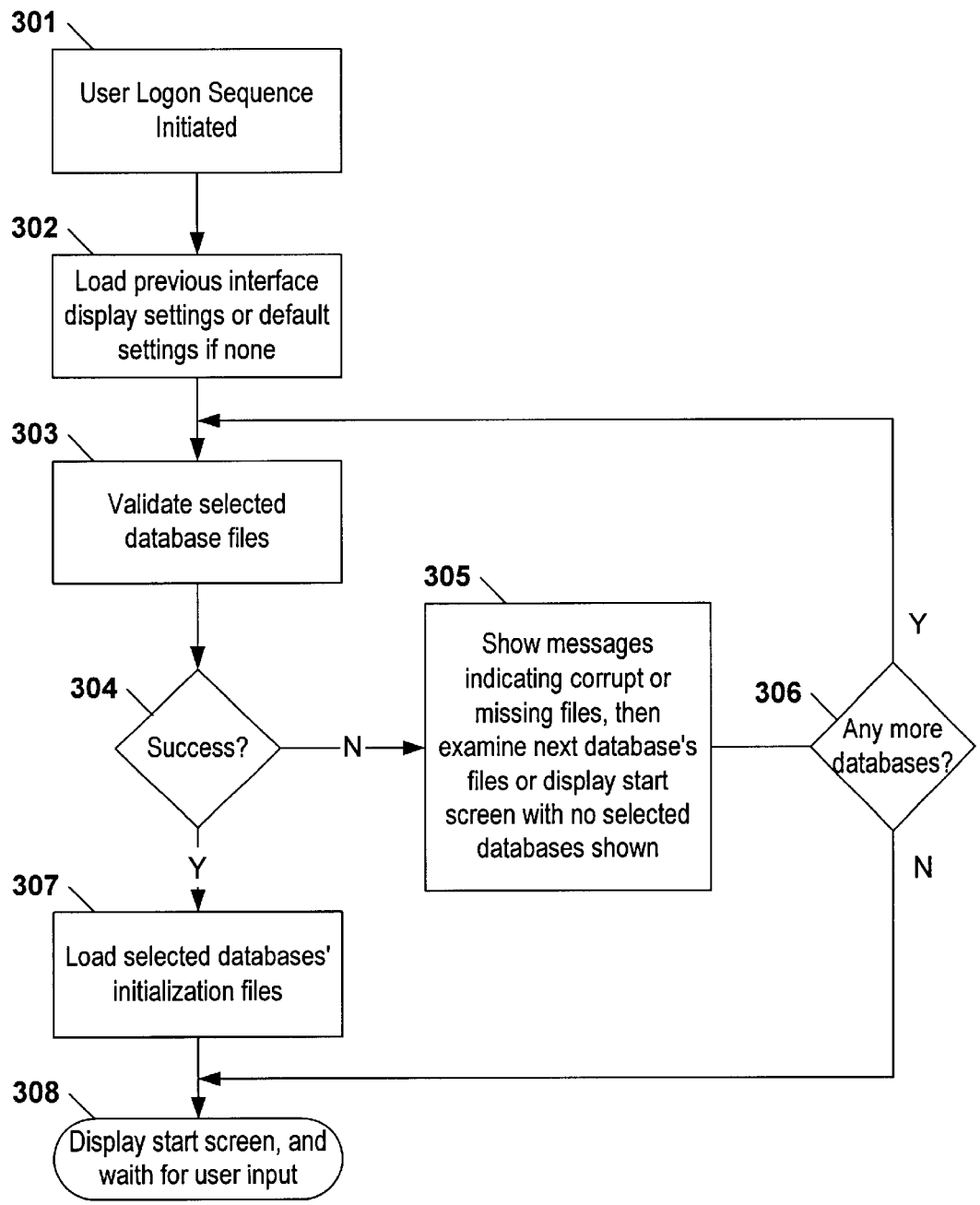
FIG. 3 is a flow diagram of an exemplary startup sequence of a database application program implemented according to the present invention.

FIG. 3 is a flow diagram of an exemplary startup sequence of a database application program implemented according to the present invention. When a user starts the program, a user logon sequence is initiated at a block 301. The user logs in to the system, and the program first loads the previous interface display settings or default settings if there are no previous interface display settings at next block 302. The interface display settings include a list of selected databases. The program checks each database that has been selected for searching and validates selected database files at next block 303. If the validation fails as indicated at next block 304, a message is displayed alerting the user that the database has corrupt or missing files at block 305 and deselects the problem database from the program. If there are more databases that have not been validated as determined at block 306, then operation returns to block 303 to resume the validation procedure.

Each database has an initialization file that the software of the system 100 uses to generate the database index 200. Once all selected databases have been validated or deselected and success is achieved at block 304, the validated databases' initialization files are loaded at next block 307 and then operation proceeds to next block 308, where a start screen is displayed and the program waits for user instructions.

Figure 4:
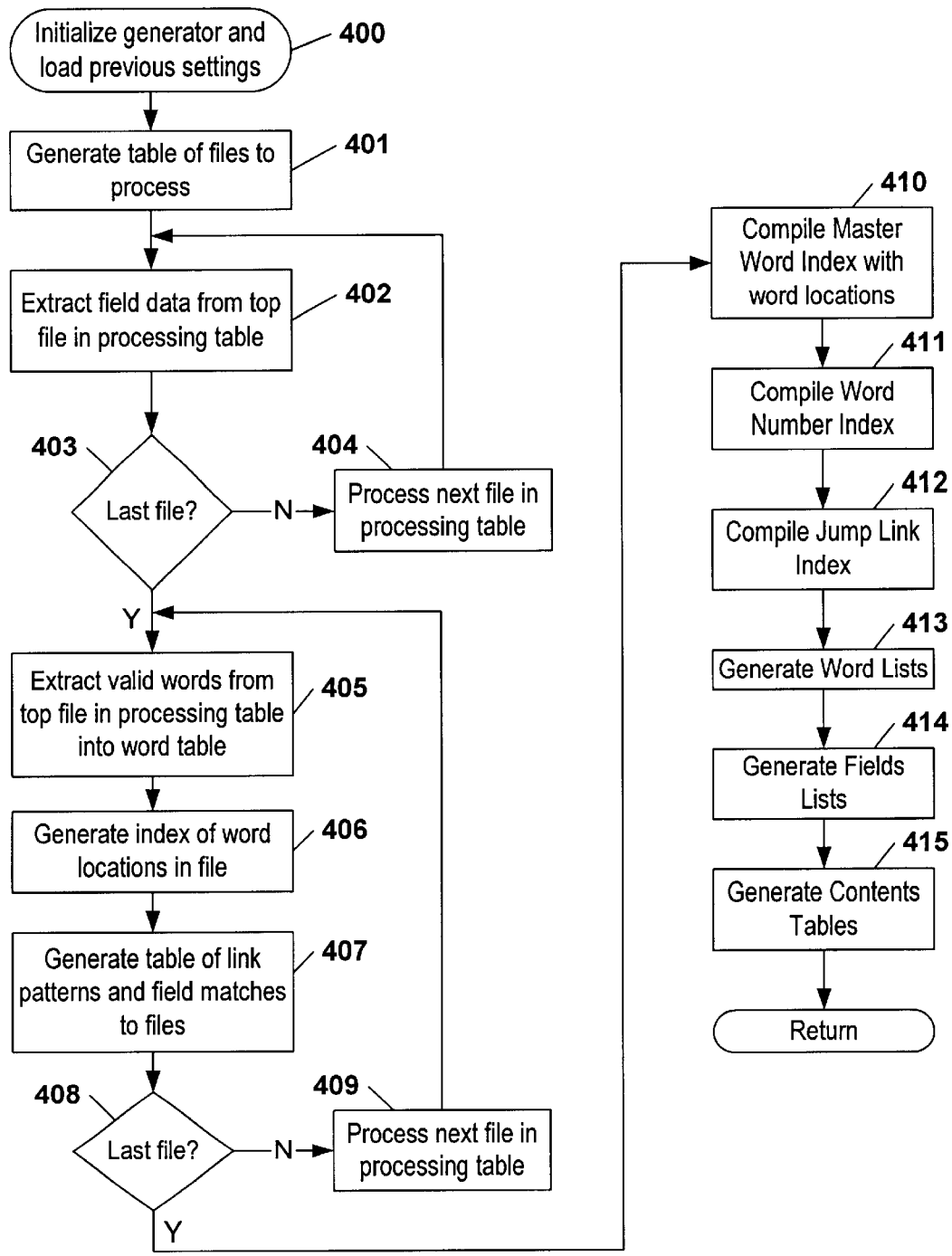
FIG. 4 is a flow diagram of an index generator processing sequence of the database application of FIG. 3.

When logged in to the program, a user may generate a database index. FIG. 4 is a flow diagram of an index generator processing sequence of the database application of FIG. 3. When the user starts the database application, a database generator initializes and loads previous settings at block 400. The database generator then generates a table of files to process at block 401 based on the generator settings when the user begins the index generation process. The database generator then extracts field information (or data) from the top file in the processing table at block 402 and proceeds to the next file in the processing table as indicated at block 404 until all of the files have had their field data extracted for later compilation into the content stable 209 as determined at decision block 403.

The next series of steps corresponds to producing data for creating the master word index 202 and the word lists 214. For each file that is processed, valid words are extracted from the file and inserted into a word table at next block 405, an index of the word locations in the file is generated at next block 406, and a table of link patterns and field matches among the files th at have been processed up to that point is then generated at next block 407 as described in conjunction with the jump link list 206. Each file in the table of files is sequentially processed in like manner as indicated by block 409 until the last file has been processed as determined at block 408. In particular, operation loops between blocks 405–409 until the last file is processed as determined at block 408.

Figure 4A:
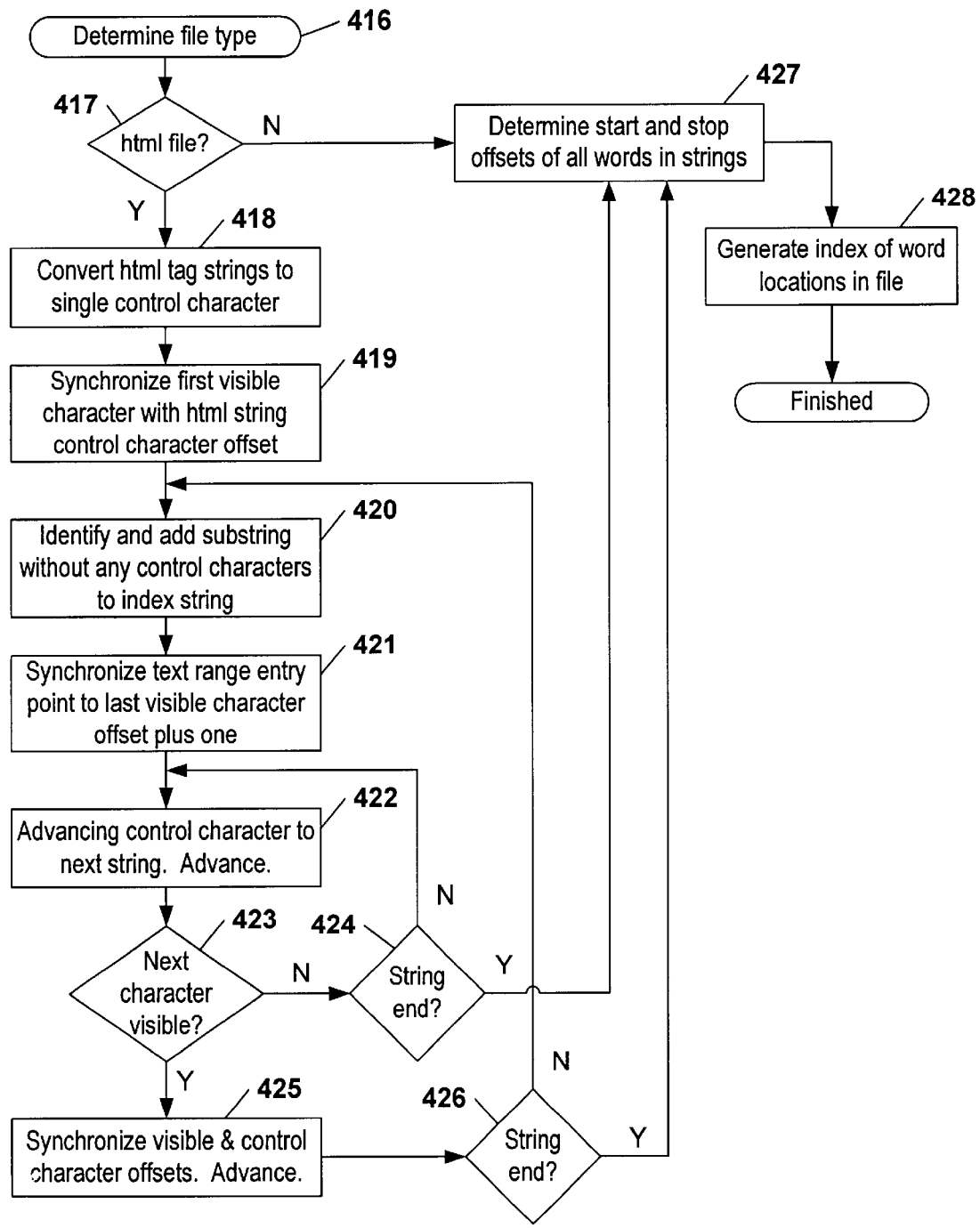
FIG. 4A is an expanded flow diagram of an index generator processing step for word locations in HTML files depicted by step 406 of FIG. 4.

Block 406's functions regarding HTML format files are more fully illustrated by FIG. 4A. The format is first determined to be an HTML file or a non-HTML file at block 417. If the file is not an HTML file, a fast and straightforward string analysis method is used to determine the locations of words within the displayable text string of the file. For example, if a file consists solely of the string "hello, world", the first word occupies file positions 1–5, and the second word occupies file positions 8–12. Once the search engine reports that "world" is in the file, it determines its file positions so the word can be set off with different color text or by some other means. If the file position information for the word is not accurate, then the retrieved word will not be highlighted accurately.

The string analysis method first requires obtaining an index string wherein all visible characters occupy positions absolutely relative to each other. The index string is then parsed into words entered into an index along with the numeric word location in the string. In the "hello, world" example, the search engine can then go to the absolute position of 8 as the beginning of "world" instead of the relative position of "the end of 'hello' plus 3" to get the display data for the word.

A string analysis method can be adapted to handle embedded control characters provided their behavior and characteristics are consistent. For example, an image in a RTF file may consist of thousands of bytes, but the beginning and end of the sequence is consistently identified, and the entire sequence always affects the file position the same way. Thus, the string analysis method can simply discard all image byte sequences without affecting the absolute position determination of visible characters in words.

HTML files involve major complications for using a string analysis method to determine file positions. HTML control tags are placed in line with visible characters. Some of the tags cause the file position to increase, and some do not. Furthermore, the parameters and tag content can be of unlimited and indeterminate length. A simple HTML file that only displays "hello, world", can have thousands of invisible control characters before the first word, thousands between it and the second word, and thousands after that. Furthermore, whether those control characters cause the file position of a visible character to increase or not depends on the type of HTML tag and the interaction of other HTML tags. Consequently, obtaining an accurate index string to parse is immensely difficult when HTML files are involved. Other mark up language file types, such as SGML, etc., present similar but less egregious problems in obtaining accurate index strings. The method described herein for HTML files can also be used for other types of mark up language files.

The problem is that there is no known accurate way to determine what the effect of present and future HTML control tags will be relative to the file positions of visible words displayed by an HTML viewer when using a string analysis method. HTML viewer technology includes a text ranging method to determine where visible characters are displayed. Essentially, this method assigns a null value to non-incrementing control tags, including their parameters, and a byte value to tags that cause the display to advance the "file position pointer" when they are encountered. The technology also includes rules for determining whether the interaction of tags changes their behavior with respect to advancing the file position pointer. An accurate index string representing not only the relative file positions of words within an HTML file but also the starting position can be generated using a text ranging method. However, the method is slow compared to a string analysis method because each byte in the file has to be analyzed individually, and single byte analysis using the text range method requires beginning at the first byte of the html string. Thus, the time required for analysis increases exponentially with increasing lengths of files to be analyzed. The present invention overcomes the inaccuracy of the string analysis method used on HTML files and the slowness of the text ranging method.

The entire HTML file is a string of bytes, which will be referred to as the html string. From it, a second string consisting of only visible characters and single byte representations of all adjacent control characters combined will be derived and referred to as the visible character string. The objective is to generate an index string for parsing that will contain visible characters positioned absolutely relative to one another numerically. The index string is analogous to a plain text file string or structured file strings, such as RTF, etc., and can be unambiguously parsed to determine word locations absolutely relative to one another.

At block 418, all HTML control tags and their contents are converted to single characters in the non-displayable range, typically ASCII 1 through ASCII 31. In the same block 418, adjacent strings of these control characters are then combined into just one control character. Thus, the example of "hello, world", would be reduced at most to 15 characters regardless of the length and complexity of embedded HTML tags. This is the visible character string.

The HTML viewer starting position of the first visible character must next be determined relative to the html string, which is done at block 419 by using the text ranging method. From that point, the objective is to maintain synchronization between the html string and the visible character string. String analysis is used for adjacent visible characters, and the method involves designating a sub-string with its start being the character following a control character and the end of the sub-string being the character preceding a subsequent control character. Such a sub-string segment is then added to the building index string in one step, whether it is one or thousands of characters in length as depicted by block 420.

At this point, the effect of the encountered control character must be determined, and that first involves synchronizing the entry point for the text range method into the html string. Depicted by block 421, the length of the sub-string added to the index string in block 420 is added to an html string processing variable, and that is where the text range method is applied to the html string. One by one, each byte is analyzed as depicted by block 422. If it advances the file position pointer, it is added to the index string. If the next character is not visible (block 423), a test for the end of the html string is performed at block 424. If so, the index string is completed, and processing is transferred to block 427 for string parsing and subsequent word location index generation, block 428.

If the next character is visible, resynchronization of the HTML string processing variable is performed at block 425 so that the next entry point will land on the next control character after the length of the next sub-string is added when block 421 is next encountered. Before leaving block 425, the next byte is analyzed at block 426 to determine if the end of the string has been encountered. If so, processing is transferred to block 427 as previously described. If not, the processing is transferred to block 420 again, and the process continues until the entire index string is accreted.

The process of block 407 on FIG. 4 is straightforward. Link patterns and field matches are designated by the user through the Linking Control Panel depicted by FIG. 11 and the Options for Field Links dialog depicted by FIG. 13. When a user designates a custom link word by entering it in text box 1101, associates it with a specific file (such as a glossary) by entering its path into text box 1102, and then clicks the Add New Link button 1104, instructions for that link have been programmed into the index generator. Likewise, when a user specifies a link pattern by entering it (with or without optional wildcard characters) in text box 1106, associates it with a particular field number by selecting one in the options box 1107, and then clicks the Add New Link button 1108, instructions for that link pattern have been programmed into the index generator. The user selectable options depicted on FIG. 13 allow refinement of the link pattern choices. For example, a user may want to use aliases or synonyms so that "equine" is also linked when "horse" is the primary pattern.

Functionally, generating valid links automatically as depicted by block 407 of the database index generation process of FIG. 4 is a two step process. First, the virtual list of link pointers (words and patterns) is checked each time a word is extracted in block 405. If the word is on the list, the virtual list of all the files that will be in the final database (that is, a virtual table of contents) is checked to determine if a link target exists for the link pointer. For example, a pattern of "# S.W.2d #" might match a potential link pointer of "877 S.W.2d 200" that designates a file with a field likewise containing "877 S.W.2d 200" as the target. However, if the target file is not in the virtual table of contents, the pattern will not be designated as a link pointer. This avoids having link pointers that have no target being created.

Generating valid links from patterns requires knowing the potential link pointers associated with specific target files. If a target file exists in the virtual table of contents, the link pointer can be inserted during the first pass through the files.

The process is simpler in the case of words becoming link pointers. The virtual table of contents is examined to determine if the target file for a word is included. If so, a link pointer is created when the specified word is encountered. As with link patterns, the validity of all links is assured because no link is created before the existence of its target is established.

At block 410, the master word index 202 is then compiled with the index of word locations. Block 411 entails assigning unique numbers to every unique word in the database which produces the word number index 203 having its two parts, the DSI 204 and DSF 205. Based on the data collected, the generator program's jump link index is compiled at block 412, resulting in the jump link list 206 having its two parts, the OAI 207 and the OAF 208. At next block 413, the word lists 214 are generated, resulting in the WDL 215, the WDN file 216, and the WDR 217. The fields list 212 is then generated at next block 414 to include the individual pre-sorted lists CO1, CO2 ... CO# 213. The contents tables 209 then are generated at next block 415 to include the COI 210 and the COF 211. The generator program returns to the start dialog allowing a user to generate another database's index or to exit.

A graphic user interface (GUI) embodiment of a database application program according to the present invention will now be described which provides utilities for database index generation and database selection and searching. The following FIGS. 5–15 are exemplary screen shots at various stages of the database application program in order to demonstrate the principles of the present invention. The database application program may be executed on the computer system 100, where each of the screen shots or displays are displayed on the display 112 and viewable by a user of the computer system 100. The GUI database application program may comprise a more specific embodiment of the system 170 shown in FIG. 1C, and may further incorporate the principles described in relation to the flow diagrams shown in FIGS. 3 and 4.

Figure 5:
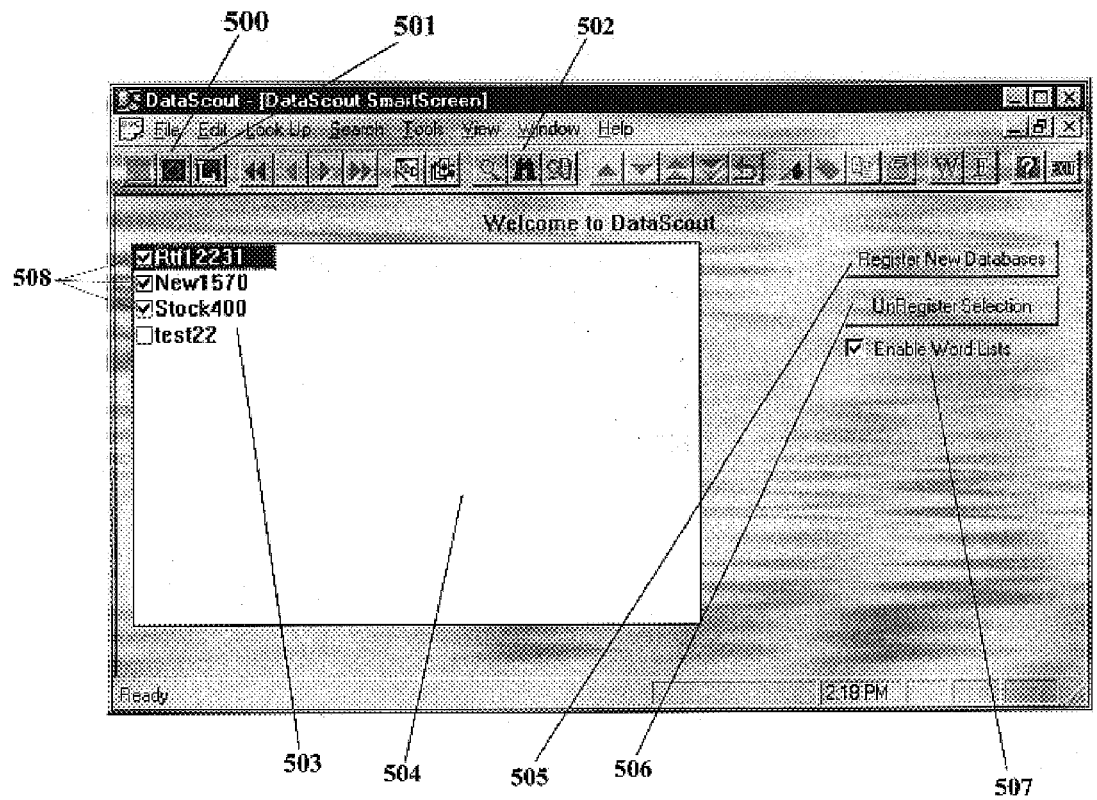
FIG. 5 is a screen display illustrating an exemplary database registration dialog of a graphic user interface (GUI) embodiment of a database application program implemented according to the present invention.

FIG. 5 is a screen display illustrating an exemplary database registration dialog of a graphic user interface (GUI) embodiment of a database application program implemented according to the present invention on a computer, such as the computer 100. The screen display includes a view options button 500, a database generator button 501, a search button 502, a database display window 504 which provides a list of database names 503, a Register New Database button 505, an UnRegister Selection button 506, and an Enable Word Lists control 507. The database display window 504 shows that four databases are registered as a result of previous use of the Register New Database button 505. As indicated by associated checkmarks 508, three of the registered databases have been selected. For example, a database may be selected when the user performs a standard operation with the mouse 114 by clicking a button on the mouse 114 while a cursor is on the database name, thus, causing a checkmark 508 to appear adjacent to the database name 503.

Figure 6:
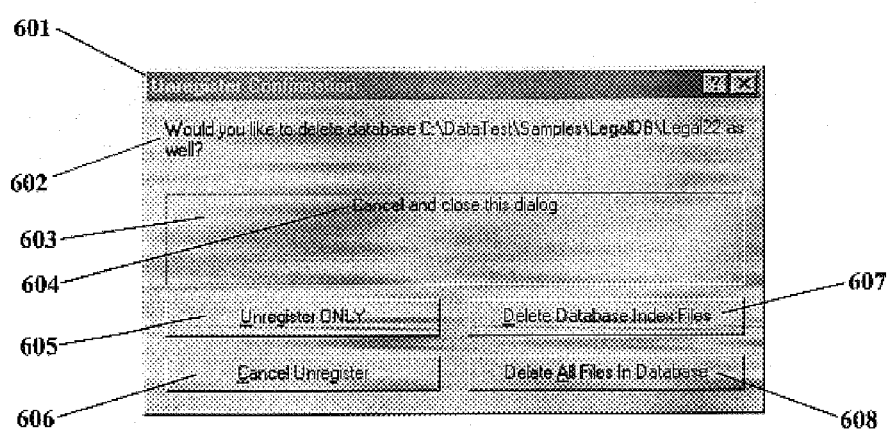
FIG. 6 is a screen display illustrating an exemplary unregister confirmation dialog of the GUI database application program introduced in FIG. 5.

FIG. 6 is a screen display illustrating an exemplary unregister confirmation dialog 601 of the GUI database application program introduced in FIG. 5 that appears when a user has highlighted a database name 503 and then selects the UnRegister Selection button 506. The unregister confirmation dialog 601 presents the user with an unregister confirmation message 602 that reminds the user of other options that are available. A message box 603 presents the user with various messages according to the position of the mouse pointer. A message 604 is shown in the message box 603 when the mouse pointer hovers over a Cancel Unregister button 606. The message 604 in the message box 603 changes when the mouse pointer is moved to other positions such as over an Unregister ONLY button 605, over a Delete Database Index Files button 607, or over a Delete All Files In Database button 608 to perform the indicated functions.

Figure 7:
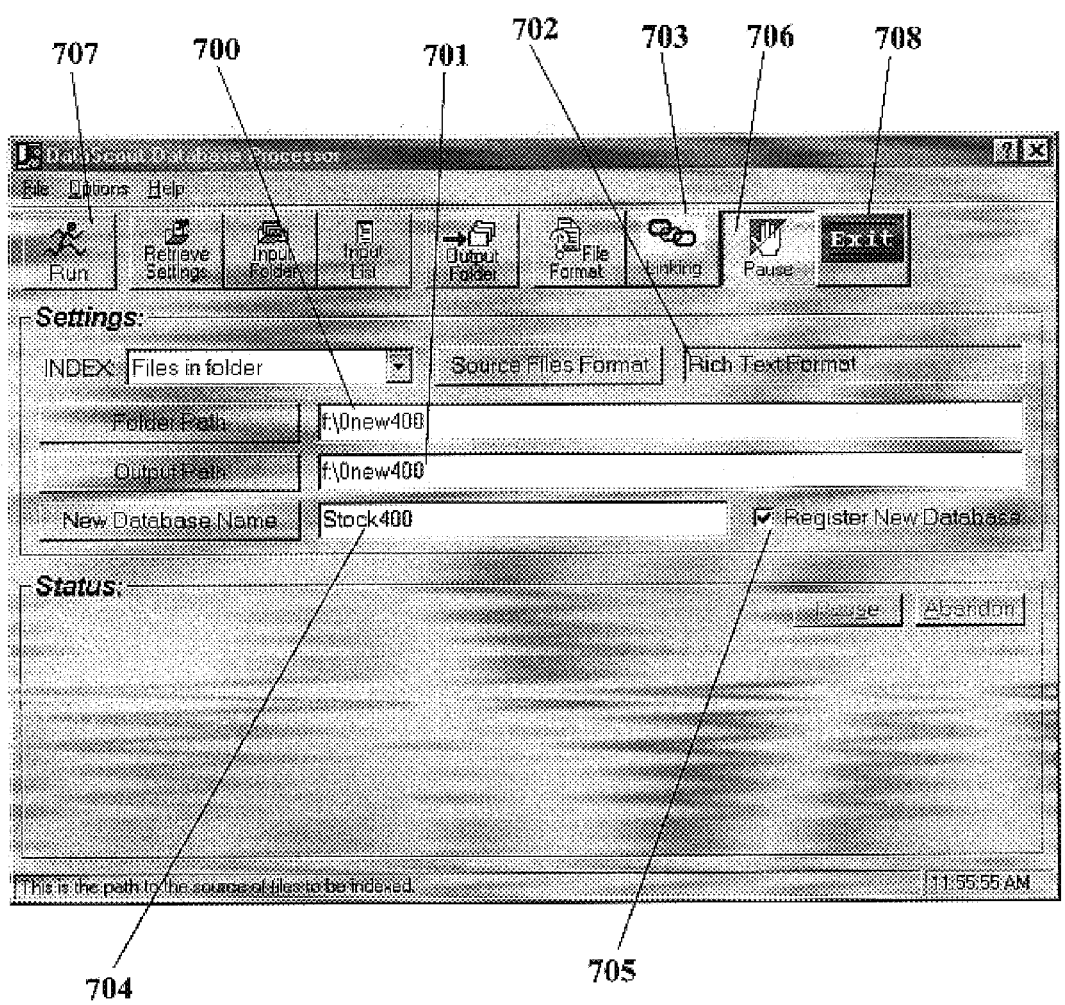
FIG. 7 is a screen display of an exemplary index generator dialog of the GUI database application program introduced in FIG. 5.

FIG. 7 is a screen display of an exemplary index generator dialog of the GUI database application program introduced in FIG. 5 as it might appear after a user 1 presses the database generator button 501. The index generator dialog includes a source file location edit box 700, a database output directory edit box 701, a generator type selection box 702, a set link properties or Linking button 703, a New Database Name edit box 704, a Register New Database check box 705, an enable Pause feature button 706, a Run button 707, and an Exit button 708. The index generator dialog is used for registering a database or regenerating the database index 200 from a previously registered but changed database. Should the user press the Run button 707 without changing any of the FIG. 7 parameters, the database indicated is registered and appears as shown at 503 in the database display window 504. If the database has already been registered, the database index 200 is regenerated when the Run button 707 is pressed. Checking the register new database check box 705 causes the generator to register new databases or to reregister changed databases and add them to the database display window 504. A user might choose to regenerate a database index in this manner if any of the source files in the source file location edit box 700 have been changed or if any files matching the generator type selection box 702 were added or deleted. The Pause button 706 toggles a feature that allows the user to suspend database processing indefinitely. When the pause feature is disabled, the generator completes its tasks faster.

Database indexes are made from documents or files located at a path to a directory or folder indicated in the source file location edit box 700 and according to the file type indicated in the generator type selection box 702. If the documents of the database index are located remotely, e.g., on the World Wide Web (WWW) of the internet, the source file location edit box 700 contains a hypertext transfer protocol address, i.e., an "http" (HyperText Translation Protocol) address to the location. Of course, other types of addresses/designations are available for remotely accessible files, and these various types of addresses/designations are entered into the source file location edit box 700 in a similar manner. A database index is placed in the location shown in the database index output directory edit box 701 when generated from the selected files. Before pressing the Run button 707, the user can press the Linking button 703 in order to cause the documents of a database to have custom links to one another automatically generated at the same time the database index is generated (see FIG. 11 and related discussion). However, in order to understand searching operations of the software of the invention, at this point it is assumed that links have already been set and a database index has already been generated.

Figure 8:
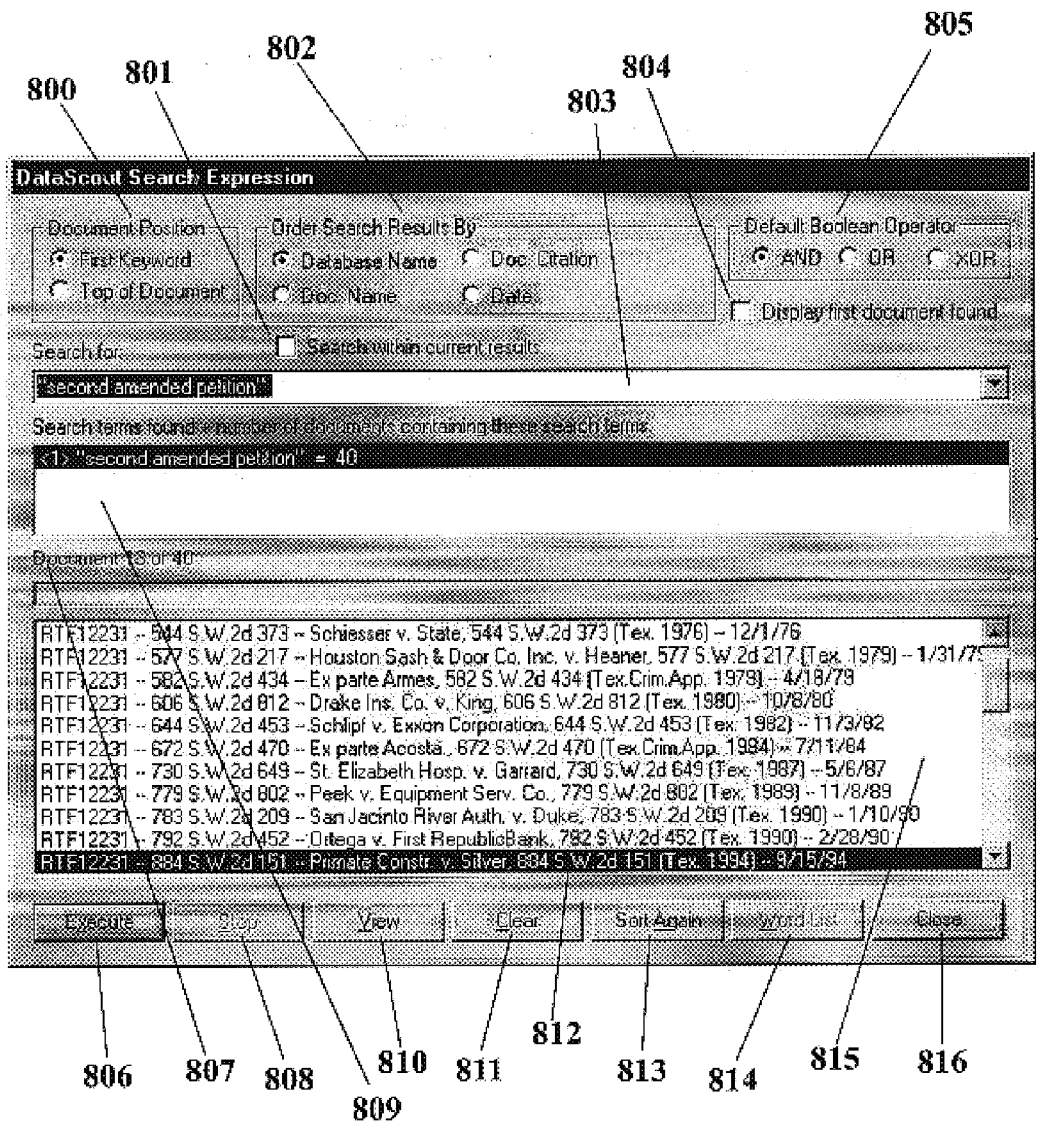
FIG. 8 is a screen display of an exemplary search/retrieval dialog of the GUI database application program introduced in FIG. 5.

FIG. 8 is a screen display of an exemplary search/retrieval dialog of the GUI database application program introduced in FIG. 5 that is displayed when a user presses the search button 502. The search/retrieval dialog presents the user With a search expression edit box 803 in which the user enters search terms of interest. In this case, the search terms "second amended petition" (including the quote marks) have been entered into the search expression edit box 803. The search expression edit box 803 supports search expressions of any degree of complexity by using the following techniques: parentheses; phrases set off by double quotations;

proximity expressions; single- and multiple-character conflation in any combination of leading, middle, and trailing conflation; and default or overriding explicit Boolean operators, such as AND, OR, XOR, etc. Other search expression techniques are also contemplated.

In addition, the search/retrieval dialog includes default Boolean operator controls 805 to determine how the system interprets multiple words entered in the search expression edit box 803. For example, if only two terms are entered without being surrounded by double quotation marks and the default Boolean operator is AND, the system finds all occurrences of both terms in documents that contain both terms. If the default Boolean operator is set to OR using the same example, the system finds all occurrences of either term in all documents with either term. If the default Boolean operator is set to XOR, the system finds all occurrences of either term only in documents that contain one term but not the other. Further, when checked, a Search within current results box 801 causes the system to perform the search called for in the search expression edit box 803 only for those documents found by the previous search.

Once search terms are entered into the search expression edit box 803, a search of the database indexes for each of the selected databases 503 is performed by the search module 183 when an Execute button 806 is pressed. Further, the Execute button 806 causes all selected databases 503 to have instructions applied such as where to position a document when viewing it on the display 112, how to order search results, etc. For example, some instructions are set with a Document Position control 800 that designates whether the document, when a View button 810 is pressed, is displayed from its first line at the top of the document or from the location of the first search term that was found. Further, an Order Search Results By control 802 determines the sort order for the list of documents found that are to be displayed in a documents found window 815. If a Display first document found checkbox 804 is checked, the system displays the first document found that satisfies the search expression without the intermediate display of the completed search results.

After the Execute button 806 is pressed, the system records and displays its progress in a Search terms found window 809 and includes the number of documents found that match the search criterion. After all documents satisfying the expression are found, a document number is displayed in a document counter 807 and the documents found window 815 is populated in the order indicated by the order search results by controls 802. The View button 810 causes a highlighted document 812 to be displayed according to the Document Position control 800 setting. Should the number of documents found exceed the number that can be displayed in the documents found window 815, a scroll bar, the down arrow, and the Page Down keys are available so that the user can see the other documents found.

Since a database application program, in one embodiment, is configured to simultaneously search over two billion databases, each with over two billion files, and each file with over two billion characters, the user may want to stop a search after it has started. For that reason, a Stop button 808 is provided. Further, a Clear button 811 allows all data to be cleared from the search expression edit box 803, the search terms found window 809, and the documents found window 815. If the Enable Word Lists control 507 is enabled, a Word List button 814 is enabled. When pressed, the Word List button 814 causes a list of all words that appear in all selected databases 503 arranged in alphabetical order to be displayed. Words can be placed directly into the search expression edit box 803 from the word list. A Close button 816 closes the search/retrieval dialog and returns the user to the previous screen without taking any further actions that may be available. Finally, a Sort Again button 813 is used to repeat the above procedure after changing the terms in the search expression edit box 803.

Figure 9:
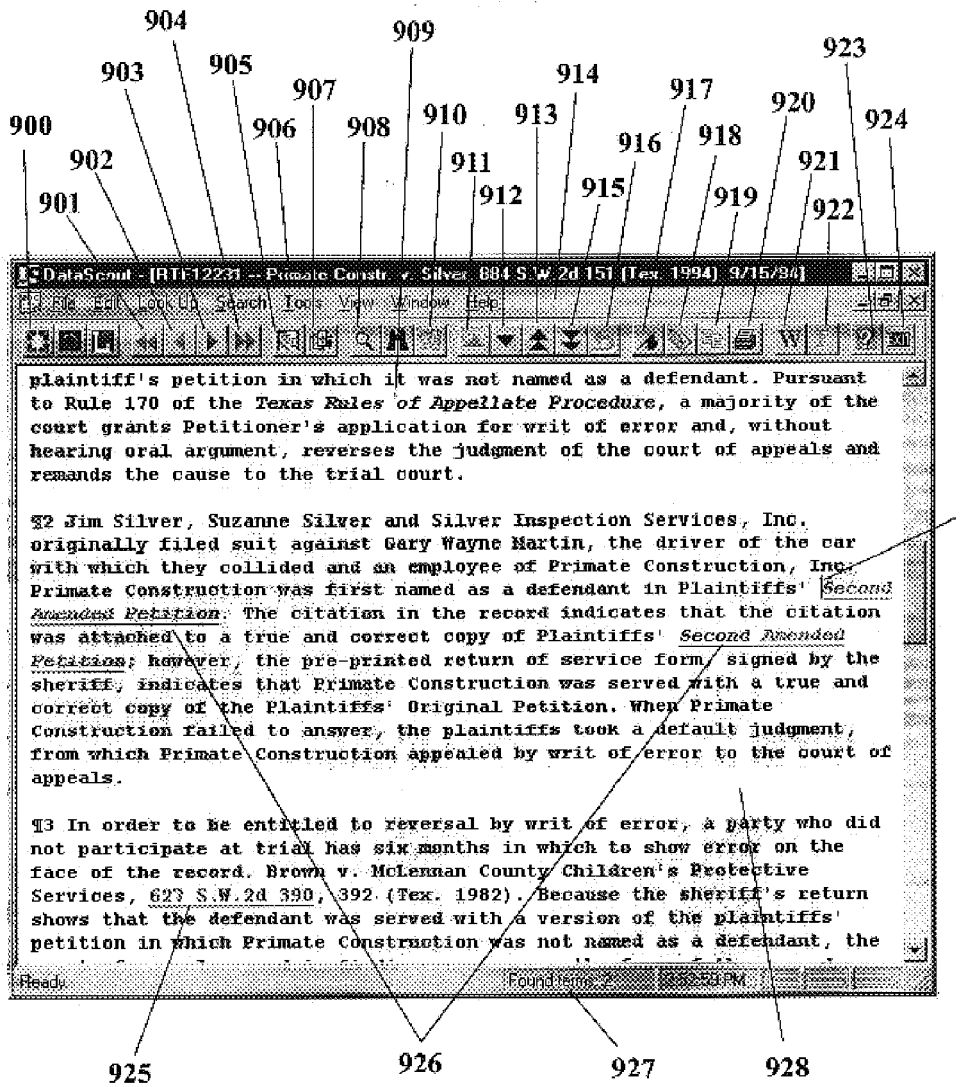
FIG. 9 is a screen display of an exemplary dialog displaying a document retrieved from a searchable database index using the GUI database application program introduced in FIG. 5.

FIG. 9 is a screen display of an exemplary dialog displaying a document, such as the highlighted document 812, retrieved from among the documents indicated in the documents found window 815. A document display window 928 displays text and graphics of a selected document being viewed in a similar manner as it would be seen in a word processor application such as MS-Word or the like. A word wrap button 921 toggles between two display states. The first state shows text as wrapping to the next line when the right side of the document display window 928 is too narrow to show all of the text in a paragraph on a single line. The second state of the word wrap button 921 displays all the text in a paragraph on a single line, and, if necessary, a horizontal scroll bar appears at the bottom of the document display window 928 which allows the user to move the contents of the window to see any portion of the text. This second state of the word wrap button 921 is especially useful when viewing documents with table type data where columns were determined by use of tabs or spaces. Since most computers use a proportional font to display text, such table type data may not align properly unless a fixed-pitch, non-wrapping display format is used. The word wrap button 921 allows the user to instantly toggle between either display format as desired.

Figure 10:
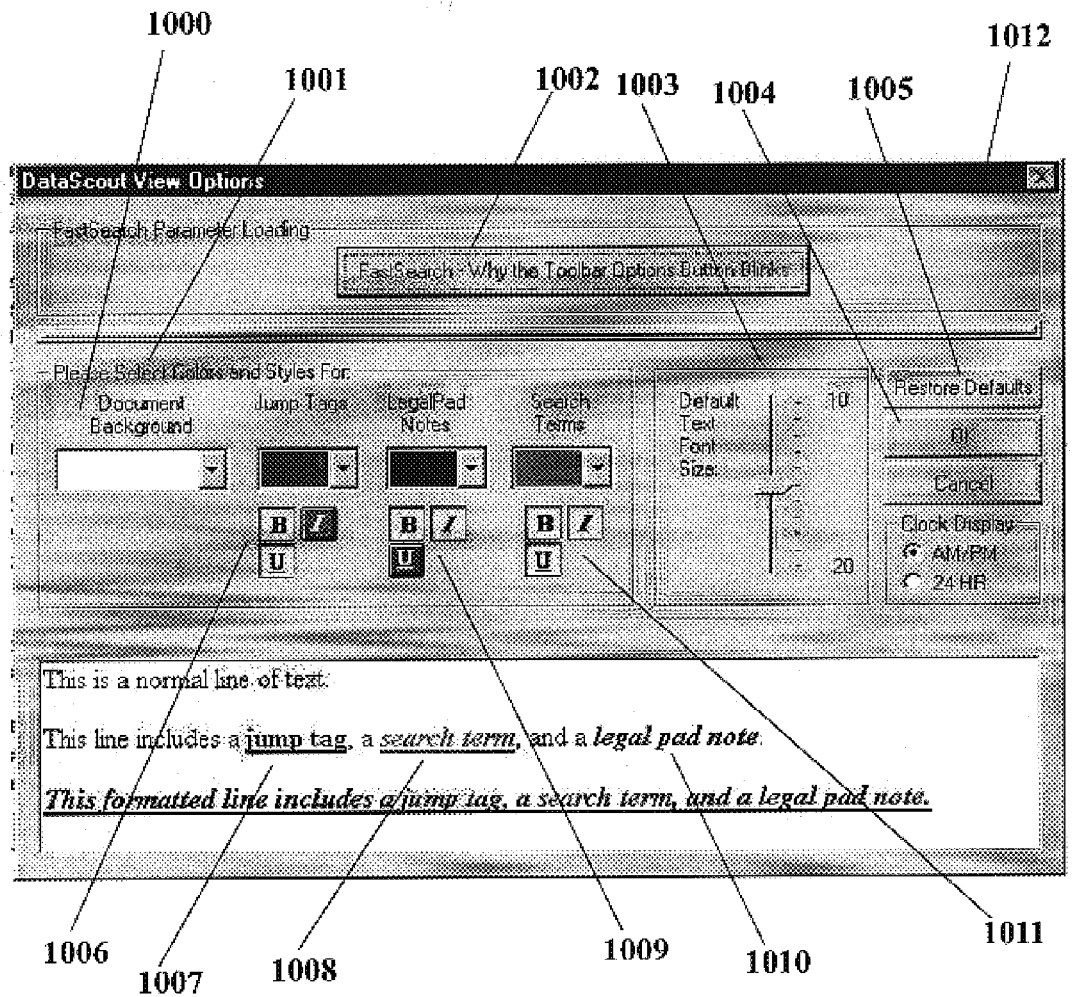
FIG. 10 is a screen display of an exemplary display options dialog of the GUI database application program introduced in FIG. 5.

A field link 925 is illustrated in the text in FIG. 9, in which the underlying text is shown highlighted with selectable color and font different from the surrounding text to indicate the link, where the highlight selections are made in a Search Terms display control 1011 (FIG. 10). When the user double clicks on the field link 925, the system displays the document that the field link 925 targets. To return to the text displayed, the user need only press a jump backward button 916. The document display window 928 then shows the text of the document 812. A found terms display 927 shows that two terms were found in the highlighted document 812 of the documents found window 815. The same information about the document 812 is accessible through activation of a title bar 906. The Document Position controls 800 were set to display the document at the first search term, and the order search results by controls 802 were set to sort the results by database name 503. A database named "RTF12231" is the first one shown in the selected databases 503, and the system assumes that the user prefers that order.

The search expression edit box 803 shows that the phrase "second amended petition" was searched for, and the document display window 928 shows two instances 926 of the phrase appearing near the center of the screen display for user convenience in determining the context of a term. The terms of the phrase are shown in font attributes determined by the Search Terms display control 1011. The previous search term button 911 is not available because the first search term in the document is displayed and current as indicated by a text cursor 950. The next search term button 912 is available because there is one more instance 926 in the document. Both the next document with search terms button 915 and the previous document with search terms button 914 are shown as available because the document displayed is the thirteenth of forty documents found as shown in the document counter 807.

Also shown in the document display window 928 is a phrase 909, "Texas Rules of Appellate Procedure". The phrase 909 is shown in bold italics to indicate that it has a legal pad note attached to it, where the bold italics is determined by a LegalPad Notes display control 1009. Legal pad notes allow a user to create reference notes that are accessible from a document in a manner similar to document access through the field link 925. The LegalPad Notes display control 1009 shows that bold italics is used when the system displays text where legal pad notes are attached. As discussed in relation to FIG. 12, a legal pad button 918 is used to create new legal pads from highlighted text.

A SmartScreen button 900 causes the system to display the same screen shown when the database application program is started (initialized) as in the example embodiment of FIG. 5. The first document in universe button 901, the "universe" including all files/documents in all selected databases, is not available and thus not highlighted because the document shown in the document display window 928 just happens to be the first document in all of the documents in the selected databases.

The same situation applies to a previous document in universe button 902, which is also not highlighted. However, a next document in universe button 903 is available as indicated by being highlighted. When the button 903 is pressed, the document following the one currently displayed is displayed. When pressed, a last document in universe button 904 causes the system to immediately display the last document in the list of all of the selected databases 503. Further, when pressed, a table of contents button 905 displays a dialog with collapsible table of contents to allow a user to quickly determine and view any file in any of the selected databases 503. The find document in entire universe button 907 displays a dialog allowing a user to type fragments of a sought document in order to find it and quickly view it.

A find button 908 allows a user to search within the document currently displayed. A direct from text button 910 causes a phrase search to immediately be executed for all text that is selected by a user and highlighted. It is not available unless some text is selected. A bookmark button 917 allows a user to place an electronic q bookmark at any point in any document through a dialog that allows the user to name and manage bookmarks. A copy button 919 allows the user to copy any highlighted text to the computer's memory for insertion elsewhere. A print button 920 displays a print dialog which provides full print utilities to the user. A font change button 922 allows a user to toggle from a proportional pitch font to a fixed pitch font for ease of viewing text formatted with spaces and tabs for columnar alignment or back to the original font. A help button 923 displays information about the system. An exit button 924 causes the system to terminate and asks the user whether data about the session should be saved or not.

In summary, the document display window 928 illustrates examples of field links 925, legal pad phrases 909, and instance 926 of search phrases. The appearance of these portions of the document display window 928 is controlled by a display options dialog that is discussed in relation to FIG. 10.

FIG. 10 is a screen display of an exemplary display options dialog, i.e., a view options dialog 1012, of the GUI database application program introduced in FIG. 5 that appears when a user has pressed the view options button 500. A FastSearch button 1002 allows the user to set a variable that controls the speed with which the system preloads certain index components when it is started. Colors and Styles controls 1001 enable the user to set display options for the document display window 928. For example, a Document Background screen color box 1000 is used to select background colors of the document display window 928. Further, a Jump Tags section 1006, a LegalPad Notes display control 1009, and the Search Terms found section 1011 are available in the view options dialog 1012, each for selecting the color, weight, and font of the text in the document display window 928. The effects of each control are immediately shown in the window appearing below the Colors and Styles controls 1001. A Default Text Font Size 1003 is set by the user. Pressing a Restore Defaults button 1005 resets all controls to their original state. Pressing an OK button 1004 accepts any changes the user has made and restores the display to the document display window 928, where the text of the document is displayed with the new display settings. In this manner, the user selects the highlighting functions, such as font options, colors and styles, for text to be highlighted from background text for text of interest, such as jump tags, legal pad notes, search terms, etc.

Figure 11:
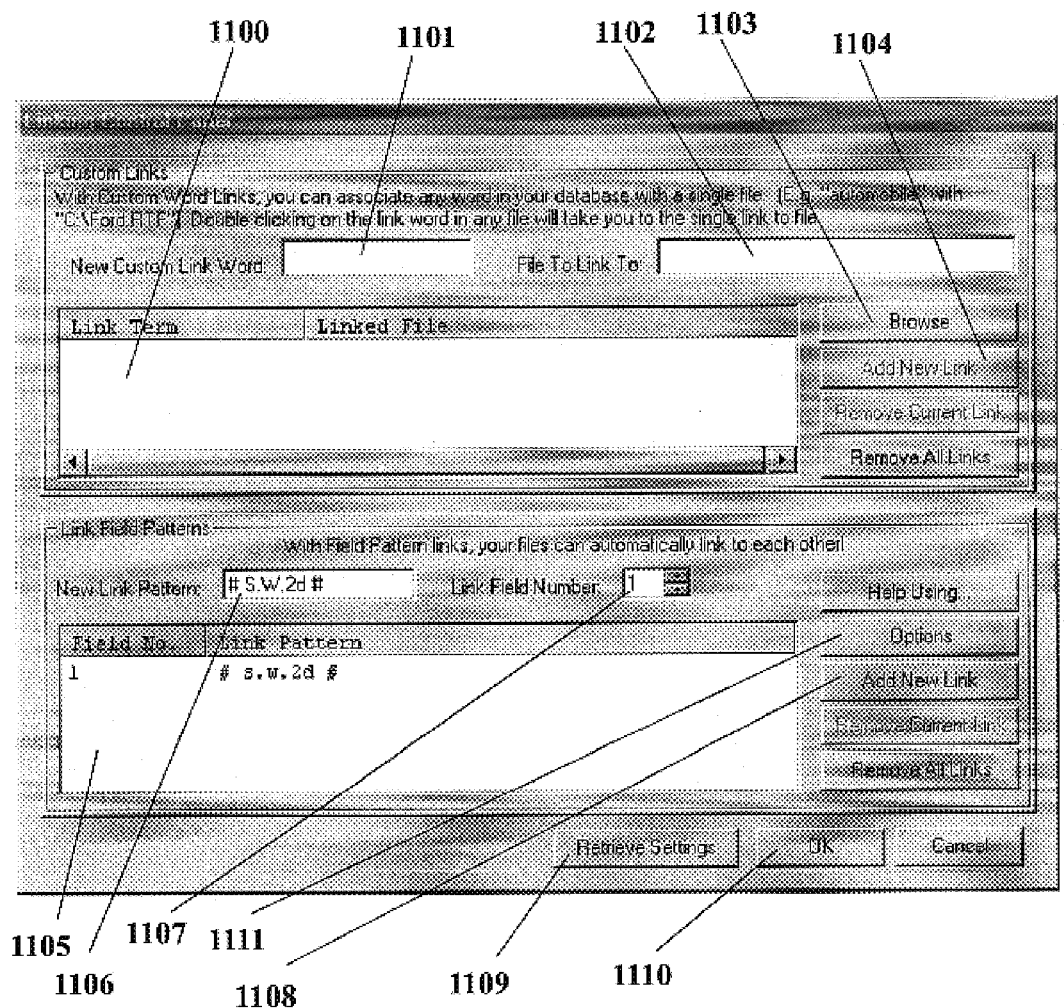
FIG. 11 is a screen display of an exemplary link generator dialog of the GUI database application program introduced in FIG. 5.

FIG. 11 is a screen display of an exemplary link generator dialog of the GUI database application program introduced in FIG. 5 for creating links between documents such as field link 925. A user can instruct the database index generator to insert custom links by entering a custom link word in a New Custom Link Word edit box 1101 and then entering a path and name of a file or document to which all such words should link in the File To Link To edit box 1102. For user ease and convenience, the path and name of the file to link to can be selected using the browse utility provided by pressing a Browse button 1103. When the user presses an Add New Link button 1104, a custom link word and file to link to pair are displayed in a custom link display window 1100. An essentially unlimited number of such pairs can be created. After the database index 200 is generated by pressing the Run button 707, whenever a user encounters the custom link word in any document displayed in the document view window 928, except the corresponding file to link to file, it is set off from surrounding text according to the display view options set by the Colors and Styles controls 1001. When the user double clicks such a word, the database application program immediately displays the file that is specified by the user as the linked file. To return to the previous document at the previous position, the user need only press the jump backward button 916. The jump backward button 916 allows the user to retrace any number of forward jumps.

The link generator dialog of FIG. 11 also allows a user to instruct the database index generator to insert field links that are based on link field patterns. A field link based on a link field pattern is a pattern sequence found in a file that exactly matches the same pattern sequence that is found in the appropriate field in another file in the database source files. To create these types of field links, a pattern is entered into a New Link Pattern edit box 1106. When the pattern of the New Link Pattern edit box 1106 matches another pattern located in a certain field of another file, a field link can be created between the files. The "certain field" of a file that is linked to corresponds to a link field number that is selected in a Link Field Number edit box 1107. After the pattern is entered into the New Link Pattern edit box 1106 and the link field number is entered into the Link Field Number edit box 1107, in this case "1", an Add New Link button 1108 is pressed and the database index is updated with the new information. The resultant field link pattern corresponding to the link field number then appears in the link field pattern window 1105.

Advantageously, a pattern entered into the New Link Pattern edit box 1106 can use "wildcard" characters. Wildcard characters are characters such as %, ?, *, and #, where each of the characters has a special meaning. In the embodiment shown, the "%" character substitutes for any digit, the "#" character substitutes for any integer greater than zero, the "*" character substitutes for any number of characters or digits between delimiters, and the "?" character substitutes for any single character. For example, a pattern "# s*d #" matches "9 sand 977", "843 S.W.2d 955", etc. An essentially unlimited number of field link pairs can be created. Of course, any number of wildcard characters may be defined depending on a particular embodiment.

Also of note, files/documents have many different file formats for their respective fields (e.g., WordPerfect® format). These formats provide for normally hidden fields to contain data about the file such as title, subject, author, etc. A system according to the present invention provides for placing visible fields in the first line of the file with each field separated by a delimiter such as a tab character.

After the database index has been generated and when the user encounters a field link in any document displayed in the document view window 928, it is set off from surrounding text according to the display view options set by the Colors and Styles controls 1001. When the user double clicks such a field link, the system immediately displays the linked file. To return to the previous document at the previous position, the user need only press the jump backward button 916.

If the database index generator has previously generated an index for a particular source file location 700, database Output Path 701, and the New Database Name 704, the linking control panel settings used previously are automatically loaded. If the user wants to migrate linking control panel settings from any previous instance, pressing a Retrieve Settings button 1109 causes display of a list of all such instances, and the desired one may then be selected and used. An Options button 1111 causes a optional field links dialog 1300 (see FIG. 13 and related discussion) to be displayed and makes additional options available to the user for creating a custom field link. Finally, pressing an OK button 1110 indicates that the user has completed customizing the field links and instructs the database generator to use the settings in the link generator dialog when creating the database index. Of course, the database index is not created until the Run button 707 is pressed.

Figure 12:
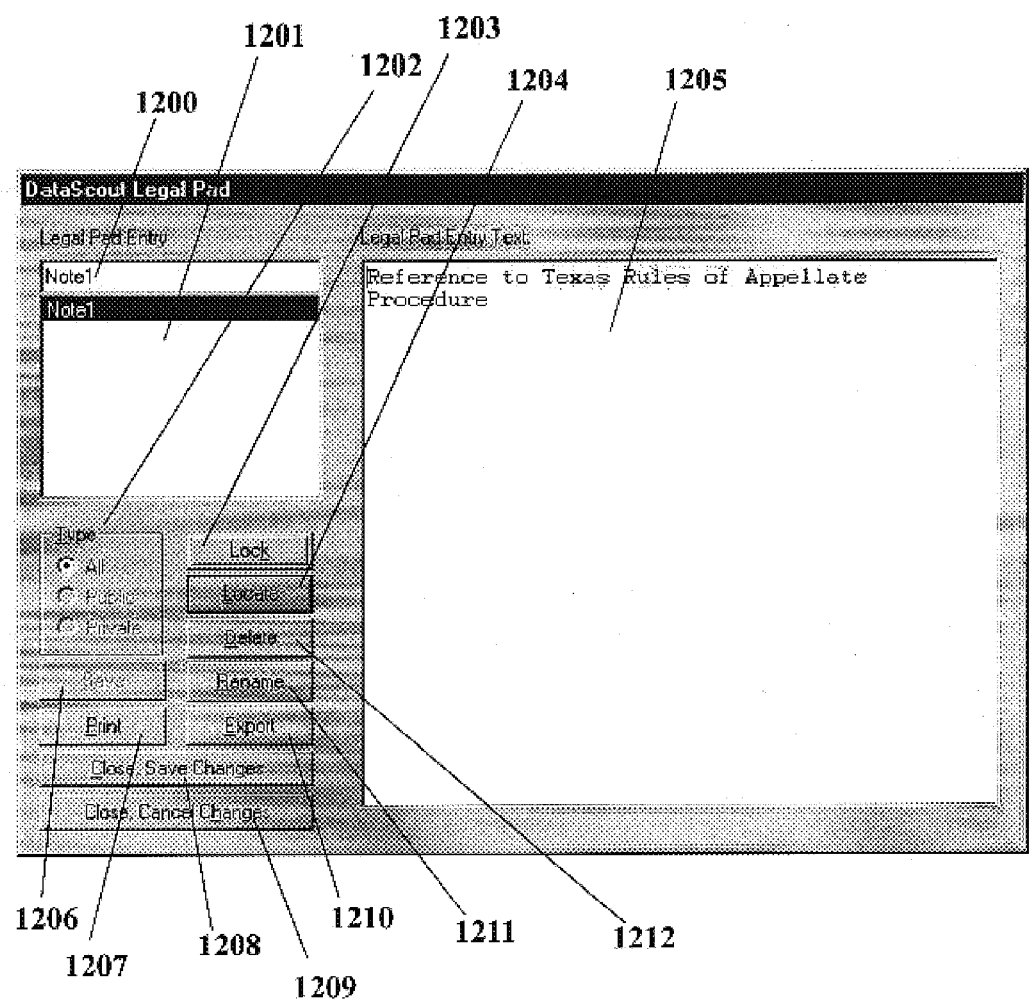
FIG. 12 is a screen display of an exemplary dialog implemented as an integrated word processor of the GUI database application program introduced in FIG. 5.

FIG. 12 is a screen display of an exemplary legal pad dialog implemented as an integrated word processor of the GUI database application program introduced in FIG. 5. As stated, the legal pad button 918 is available when text of a document has been highlighted by the user or when a legal pad entry exists for any document in any of the selected databases 503. Pressing the legal pad button 918 displays the legal pad dialog shown in FIG. 12. If some text was highlighted before the legal pad button 918 was pressed, the system assumes that the user wants to create a new entry. The next sequential note name is automatically assigned in the note name edit box 1200, but the user can change it to whatever is desired. Existing note names are shown in a note name window 1201. The user can copy or write any text into a Legal Pad Entry Text window 1205. Note Type controls 1202 allow the user to designate whether the note is to be available to other users or to have restricted access. A Lock button 1203 allows the user to prevent any modifications to the note displayed in the Legal Pad Entry Text window 1205.

A Locate button 1204, when pressed, displays the document at the position where the note is attached. The original text that was highlighted when the legal pad button 918 was pressed to create the note is displayed with the font and color attributes set by the legal pad notes section 1009 as shown by the example phrase 909. A Delete button 1212 allows the user to delete a note. A Rename button 1211 allows the user to change the name of a saved note. An Export button 1210 allows the user to save the note to an external file on any drive available to the computer. A Save button 1206 allows the user to save changes to the note without changing the current display. A Print button 1207 causes a print utility dialog box to appear enabling the user to print the current note. A Close, Save Changes button 1208 allows the user to save changes to the note and return to the document being viewed. A Close, Cancel Changes button 1209 causes any changes to the current note to be discarded and the system returns to the display as it was before the legal pad button 918 was pressed.

Figure 13:
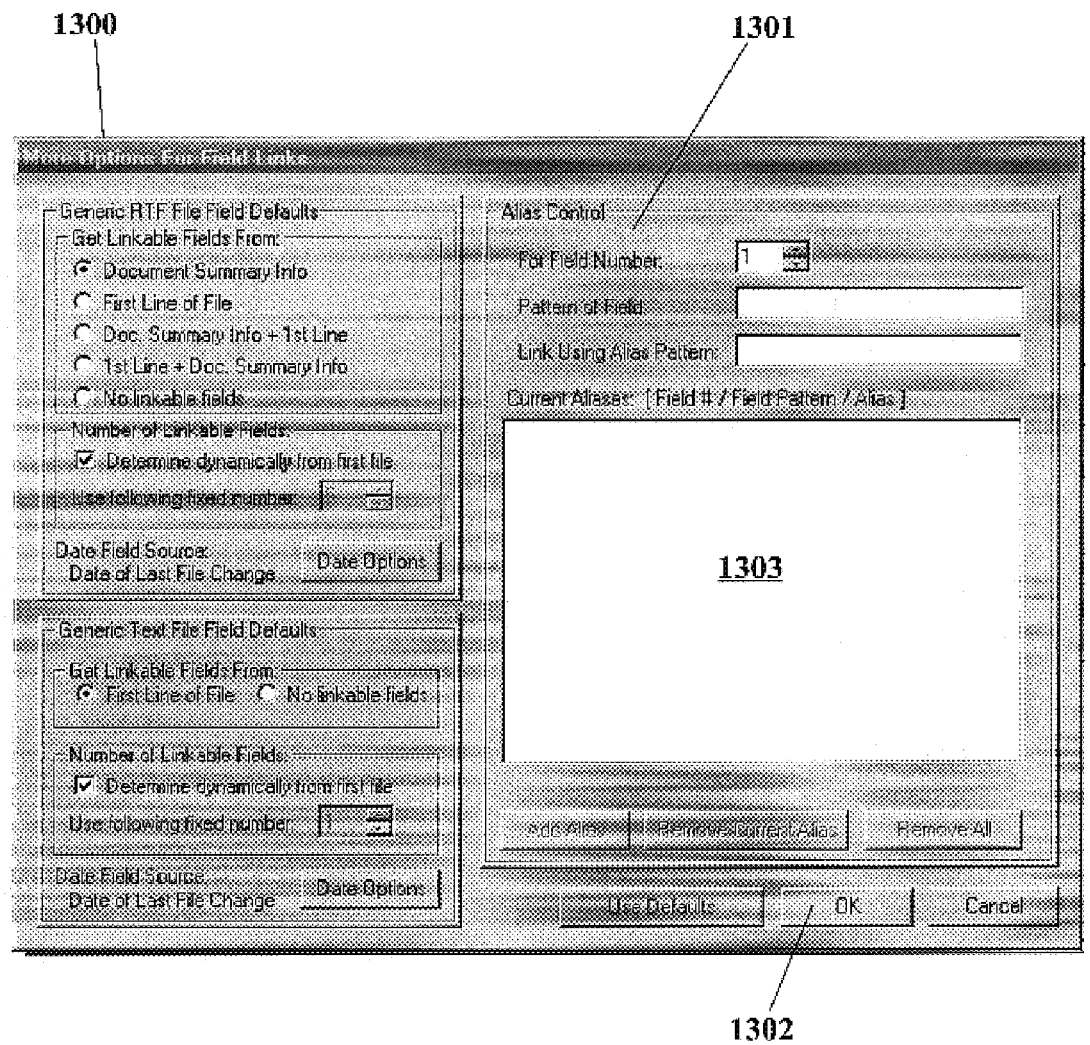
FIG. 13 is a screen display of an optional field links dialog of the GUI database application program introduced in FIG. 5.

FIG. 13 is a screen display of an optional field links dialog 1300 of the GUI database application program introduced in FIG. 5 that is displayed when the Options button 1111 is pressed. The optional field links dialog 1300 includes additional options that are available to the user for creating custom field links. An Alias Control section 1301 allows the user to define an unlimited number of aliases in a Current Aliases window 1303 for a link term so that strict correlation between terms linked to target files is not necessary. For example, whenever the term "vine fruit" appears in any of the database files, the user may want the term to be linked to a glossary file that defines the term. By setting or defining aliases for "vine fruit" to include alias terms "grape", "tomato", and "raspberry", those words also have a link generated to the glossary file just as "vine fruit" does. Pressing an OK button 1302 sets the options and restores the display of the linking control panel to its previous state.

Figure 14:
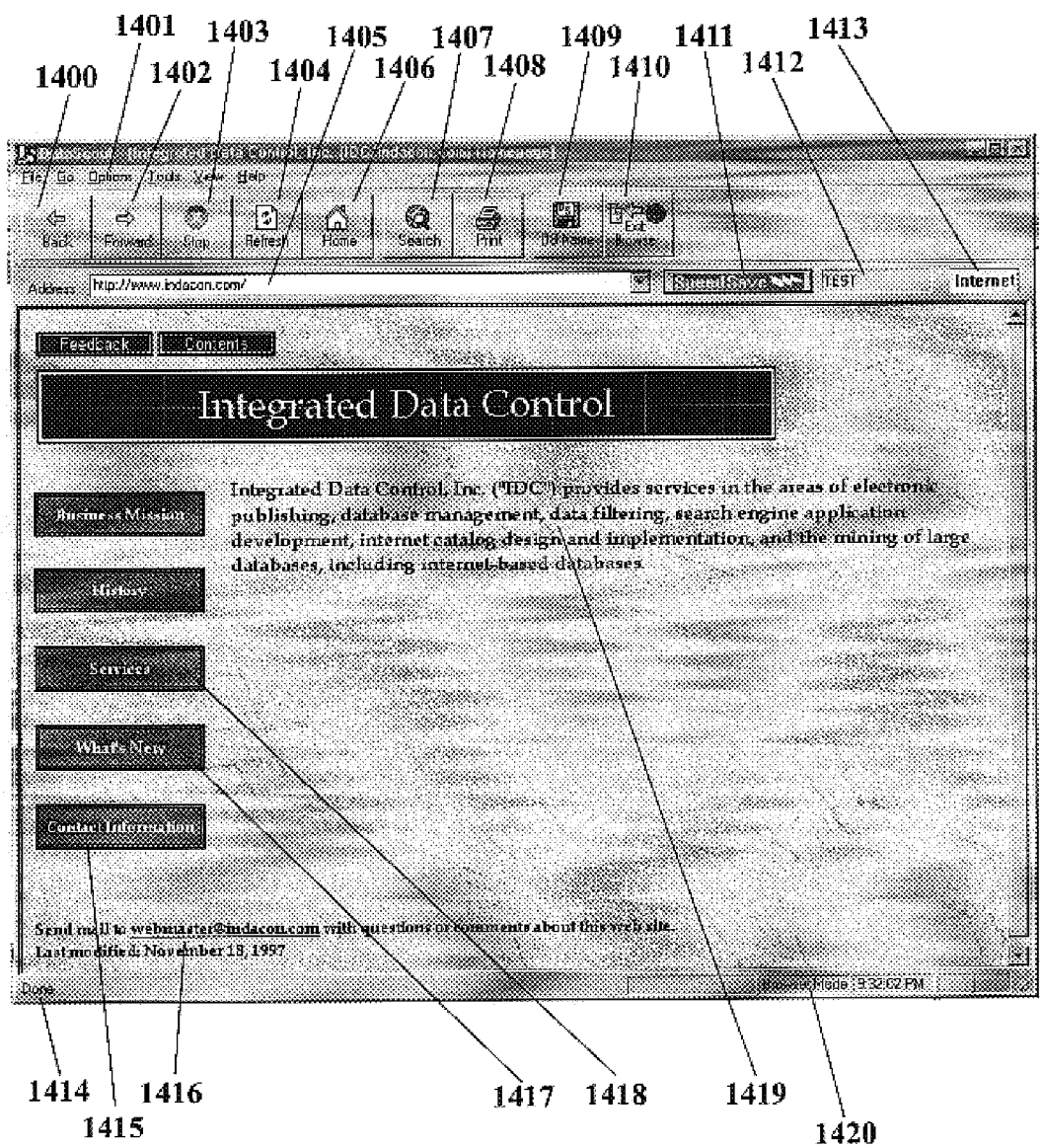
FIG. 14 is a screen display of an exemplary Browser Mode Window showing an HTM (HyperText Markup Language) document retrieved from the internet using the GUI database application program introduced in FIG. 5.

In addition to the above described example embodiment, FIG. 14 is an example screen display of a Browser Mode Window showing an HTM document retrieved from the internet using the GUI database application program introduced in FIG. 5. The Browser Mode works in a similar manner as commonly used browsers, such as Netscape Navigator or Microsoft® Explorer. The internet address of the document is shown in an Address bar 1405. If the user puts the cursor (or focus) on the Address bar 1405 and presses the Return or Enter keyboard key, or presses a Refresh button 1404, the document would again be retrieved from its internet source. By pressing a Back button 1400, the Browser Mode Window displays the previous document that was viewed. By pressing a Forward button 1402, the Browser Mode Window displays the document that was previously viewed before the Back button 1400 was pressed to display the document shown.

Pressing a Stop button 1403 terminates any internet retrieval action currently underway. Pressing a Home button 1406 causes the Browser Mode Window to retrieve and display the document at the specific internet address designated as the "Home Page" for the Browser Mode Window. Pressing a Search button 1407 causes the Browser Mode Window to retrieve and display the internet search engine page designated by a user option in an Options dropdown menu 1401. A Print button 1408 allows the user to print the document displayed and to set printing options in a dialog box that is displayed. A DB Name button 1409 displays a dialog box and list of previous database names that have been used. The current database selected is shown in a database name label 1412. A more extensive dialog box that allows the user to change other database particulars is also available as a user option in an Options dropdown menu 1401.

A SpeedSave button 1411 immediately saves the displayed document, along with all of its pictures, graphics, images, hypertext links, and layout into the database named in the database name label 1412. The first time the Speed-Save button 1411 is 1Q pressed in a session of the software, the same dialog displayed by pressing the DB Name button 1409 is displayed to safeguard against the user inadvertently saving a file into a forgotten about database. Double clicking the database name label 1412 also displays the same dialog. Depending upon the settings for the database particulars accessible under the Options dropdown menu 1401, the file can be saved as a normal "Text" file, an HTM file without images, an HTM file with images linked to their internet source, or an HTM file with all images retrieved and saved on the local computer's hard drive. Pressing an Exit Browser button 1410 causes the software of the system 100 to create a fully indexed and searchable database of all files saved into the database name shown in the database name label 1412 according to the default behavior. The database is automatically registered and shown on the database display window 504. The default behavior can be changed to accommodate a variety of user preferences through the appropriate selection on the Options dropdown menu 1401. A document location label 1413 indicates to the user whether the source of the document being viewed is remote or local, and the label 1413 changes automatically when the viewed document changes its source. A status bar message 1414 changes as appropriate to give the user information about the status of the Browser Mode Window. A Browse Mode label 1420 indicates to the user whether the software is functioning in its Browser Mode or its Viewer Mode.

The document depicted in FIG. 14 has several elements referenced in order to illustrate the capability of a system according to the present invention for allowing the user to easily edit content and arrangement of documents saved in the Browser Mode. For example, FIG. 14 illustrates a "Contact Information" graphic 1415, a "What's New" graphic 1417, a "Services" graphic 1418, a Footer Text 1416, and a Body Text 1419 which have all been manipulated, deleted, or changed as shown in FIG. 15.

Figure 15:
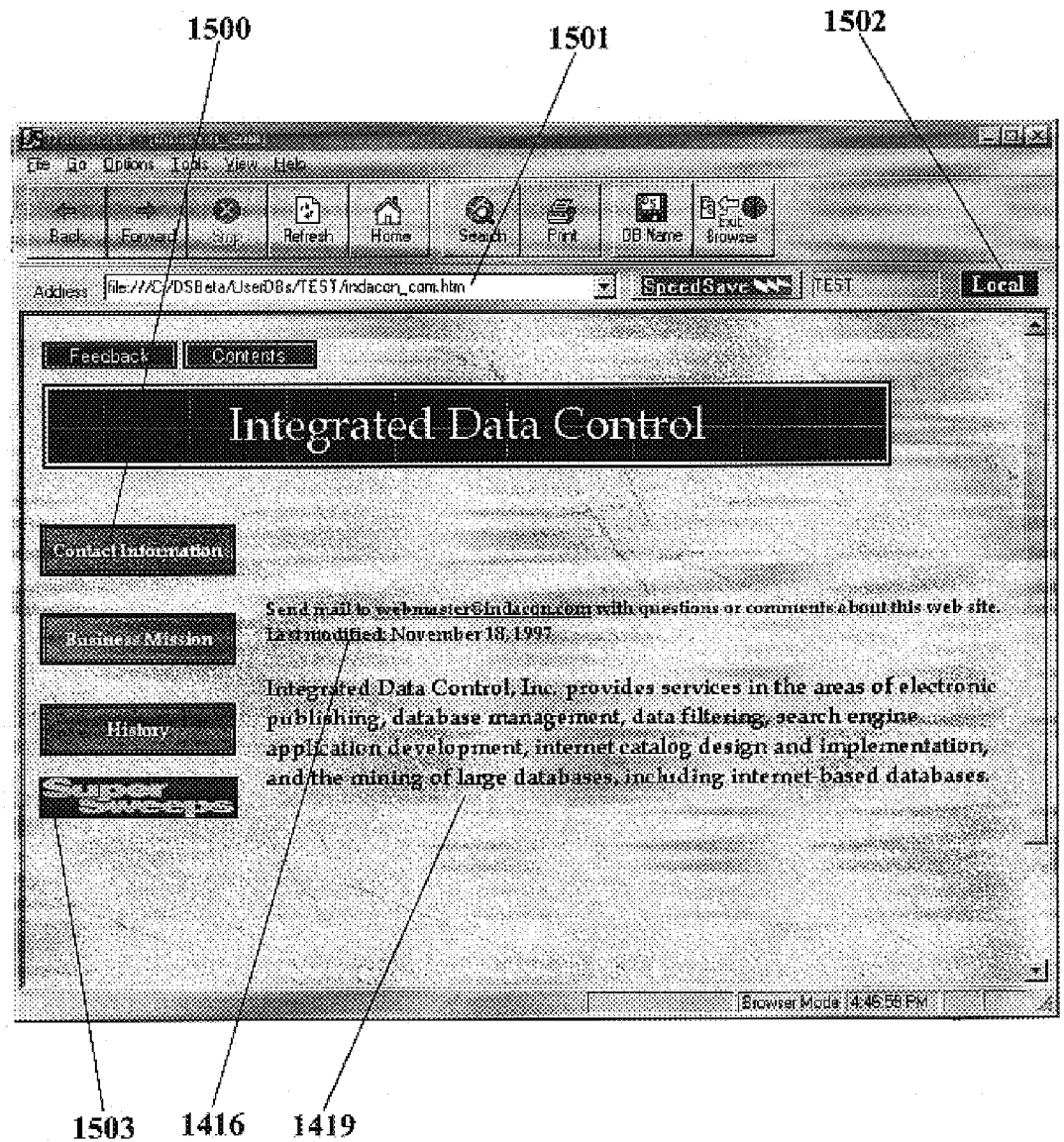
FIG. 15 is an example screen display of the HTM document of FIG. 14 after being saved and edited in the Browser Mode window in accordance with the principles of the present invention.
Figure 1C:
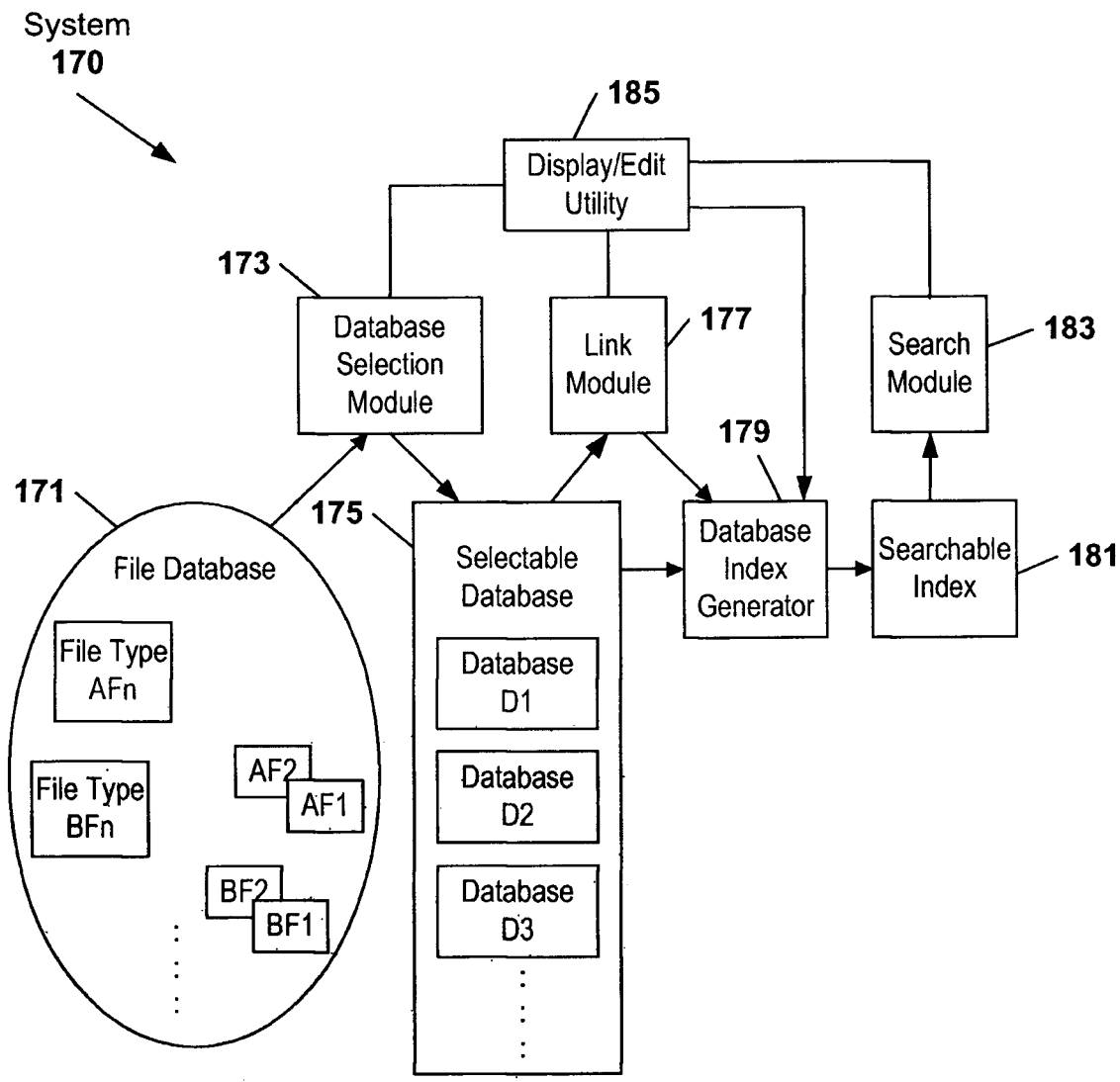

FIG. 15 is an example screen display of the HTML document of FIG. 14 after being saved and edited in the Browser Mode window. FIG. 15 shows the "Contact Information" graphic 1415 as having been moved in the left column of the document, which is now shown as Contact Information graphic 1500. The "What's New" graphic 1417 and the "Services" graphic 1418 have been deleted. A new "Super Sweeps" graphic 1503 has been added. The Footer Text 1416 has been moved to be the first paragraph of the document's new body text. The Body Text 1419 has been moved down and edited to delete the text "("IDC")" from it. Since the internet address shown in the Address Bar 1405 of the document of FIG. 14 has been saved, the Address Bar 1501 has changed to a pathname to reflect the document's location on the local computer's hard drive. The document location label 1413 indicating "internet" has also changed to be Document Location Label 1502 indicating "Local" to help ensure that the user knows the source location of the document being viewed. The editing process automatically makes all adjustments to HyperText links and other HTM codes associated with text or graphic elements that are added, deleted, or moved. When the SpeedSave button 1411 is pressed, the edited file is saved after the user selects an option to save it under a different name or to replace the existing file.

In accordance with the present invention, the disadvantages of the prior art have been overcome through the implementation of a system and method for creating at least one customizable database index for assisting in navigation of at least one database. The system includes a database index generation module that enables a user to specify at least one database for access by the user. The at least one database includes at least one document. Also included is a database index generator module that enables the user to generate a customizable database index associated with the at least one database. Further, an integration tool is included that enables the user to add references of additional databases to the customizable database index and to modify references of existing databases in the customizable database index. Also commonly included is interconnection logic that enables the user to place links within the customizable database index such that the user can cross reference one of the at least one documents from the at least one database with another of the at least one documents of the at least one database.

Another implementation of the invention uses multiple external search engines during the same search. Each search engine typically requires a different syntax to do a search. When activated, each search engine responds with different search results. The results may have different contents and formats and priorities. The results may include graphics and text that are not relevant to the information sought by the search and are therefore extraneous. The invention rejects discernable extraneous information by taking advantage of the communication method by signaling the search engine that the unwanted results are already received so they are in fact never sent. Non-discernible extraneous information is filtered out and discarded. The remaining results which are received often include duplicates which are initially compiled into lists of all results. The lists are then compiled into a single list without duplicates. The list is prioritized and presented to the user as a single, prioritized list for viewing. The list contains checkboxes that the user can check to select documents which the invention will retrieve and put through the storing and indexing processing for search and retrieval. When the user positions a mouse pointer over a URL on the list, a popup window is generated that displays the text, so the information can be screened to ascertain if it contains relevant information to the search inquiry. If the text contains relevant information, the user can then check the box for selection for downloading and insertion in the database.

The above-listed sections and included information are not exhaustive and are only exemplary or the invention. The particular sections and included information in a particular embodiment may depend upon the particular implementation and the included devices and resources. Although a system and method according to the present invention have been described in connection with the preferred embodiments, it is not intended to be limited to the specific form set forth herein, but, on the contrary, it is intended to cover such alternatives, modifications, and equivalents, as can be reasonably included within the spirit and scope of the invention as defined by the appended claims.

What is claimed is:

1. A data acquisition and perusal system, comprising:
   a database selection module that enables selection of a plurality of files for inclusion into at least one selectable database;
   a link module that enables custom links to be defined between selected terms of selected files of the at least one database;
      wherein the link module enables association of any link term with any of the plurality of files in the at least one selectable database; and
      wherein the link module enables at least one alias term to be defined for the any link term to enable a link to be established between the at least one alias term and the any of the plurality of files;

a database index generator module that enables generation of a searchable index of the data contained in the at least one selectable database, including the custom links, the generator module enabling only valid custom links to be added to the searchable index; and a search module that enables a search of the searchable index to be performed according to a search criterions.

2. A data acquisition and perusal system, comprising:

a database selection module that enables selection of a plurality of files for inclusion into at least one selectable database;

a link module that enables custom links to be defined between selected terms of selected files of the at least one database;

wherein the link module enables designation of a pattern that corresponds to one or more text strings, and wherein the link module is operable to link instances of the one or more text strings in the selected files with other of said selected files having identification data that matches the text strings;

a database index generator module that enables generation of a searchable index of the data contained in the at least one selectable database, including the custom links, the generator module enabling only valid custom links to be added to the searchable index; and a search module that enables a search of the searchable index to be performed according to a search criterion.

3. The data acquisition and perusal system of claim 2, wherein the link module enables designation of a pattern that includes wildcard characters.

4. A data acquisition and perusal system, comprising:

a database selection module that enables selection of a plurality of files for inclusion into at least one selectable database;

a link module that enables custom links to be defined between selected terms of selected files of the at least one database;

the link module enabling association of at least one selected link term with any of the plurality of files in the at least one selectable database;

at least one selected link term including at least one alias;

a database index generator module that enables generation of a searchable index of the data contained in the at least one selectable database, including the custom links, the generator module enabling only valid custom links to be added to the searchable index;

a search module that enables a search of the searchable index to be performed according to a search criterion;

at least one input device; and a display utility including a graphic user interface that enables graphic interaction with the database selection, the link and the search modules via the at least one input device, wherein the display utility displays at least portions of files in the selectable database that meet the search criterion, indicates terms in the displayed file portions that meet the search criterion, indicates any of the at least one selected link term in the displayed portions of files in the selectable database that meet the search criterion, enables interaction with any indicated selected link terms via the at least one input device to enable perusal of linked files in the at least one selectable database;

the display utility further indicating the at least one alias; and the display utility enabling interaction with the at least one alias via the at least one input device to enable perusal of linked files in the at least one selectable database.

5. A data acquisition and perusal system for finding, storing and retrieving useful information, comprising:

means for locating a plurality of accessible computer files according to a selected search criteria;

means for selecting files containing relevant information from the located files for inclusion into at least one selectable database;

means for enabling user defined custom linking relationships among selected terms of said selected files of the at least one database;

wherein said link means enables association of any link term with any of the plurality of files in the at least one selectable database;

wherein said link means enables at least one alias term to be defined for the any link term to enable a link to be established between the at least one alias term and the any of the plurality of files;

means for generating a searchable index of the data contained in the selected database including the custom links so that the searchable index includes only valid links;

means for searching the searchable index to be performed according to a search criterion to locate words and phrases in the selected database; and means for accurately highlighting the located words and phrases in the display from the search results.

6. A data acquisition and perusal system, comprising:

means for locating a plurality of accessible computer files according to a selected search criteria;

means for selecting files containing relevant information from the located files for inclusion into at least one selectable database;

means for enabling user defined custom linking relationships among selected terms of said selected files of the at least one database;

wherein the link means enables designation of a pattern that corresponds to one or more text strings, and wherein the link means is operable to link instances of the one or more text strings in the selected files with other of said selected files having identification data that matches the text strings;

means for generating a searchable index of the data contained in the selected database including the custom links so that the searchable index includes only valid links;

means for searching the searchable index to be performed according to a search criterion to locate words and phrases in the selected database; and means for accurately highlighting the located words and phrases in the display from the search results.

7. The data acquisition and perusal system of claim 6 wherein the link means enables designation of a pattern that includes wildcard characters.

8. A data acquisition and perusal method for finding, storing and retrieving useful information, comprising the steps of:

locating a plurality of accessible files according to a selected search criteria;

selecting a plurality of the located files containing relevant information for automatic inclusion into at least one selectable database;

defining custom linking relationships between selected terms and designated files of the selected database;

wherein said link definition step includes defining at least one alias term for at least one of the selected terms to establish linking relationships between the at least one alias term and one of the designated files;

verifying the validity of the custom linking relationships;

generating a searchable index of the data contained in the selected database including the custom linking relationships so that the searchable index includes only valid custom linking relationships; and searching the searchable index according to a selected search criterion to locate words and phrases in the data and accurately highlighting the located terms and phrases.

9. A data acquisition and perusal method for finding, storing and retrieving useful information, comprising the steps of:

locating a plurality of accessible files according to a selected search criteria;

selecting a plurality of the located files containing relevant information for automatic inclusion into at least one selectable database;

defining custom linking relationships between selected terms and designated files of the selected database;

wherein the step of defining the linking relationships includes designating a pattern that corresponds to one or more text strings and linking instances of the one or more text strings in the selected files with other of said selected files having identification data that matches the text strings;

verifying the validity of the custom linking relationships;

generating a searchable index of the data contained in the selected database including the custom linking relationships so that the searchable index includes only valid custom linking relationships; and searching the searchable index according to a selected search criterion to locate words and phrases in the data and accurately highlighting the located terms and phrases.

10. The data acquisition and perusal method of claim 9 wherein the step of defining the linking relationships includes designating a pattern that includes wildcard characters.

11. A data acquisition and perusal method for finding, storing and retrieving useful information comprising the steps of:

locating a plurality of accessible files according to a selected search criteria;

selecting a plurality of the located files containing relevant information for automatic inclusion into at least one selectable database;

defining custom linking relationships between selected terms and designated files of the selected database;

verifying the validity of the custom linking relationships;

generating a searchable index of the data contained in the selected database including the custom linking relationships so that the searchable index includes only valid custom linking relationships;

searching the searchable index according to a selected search criterion to locate words and phrases in the data and accurately highlighting the located terms and phrases;

displaying a graphic user interface that enables graphic interaction with the database selection, the link and the search means via the at least one input device;

displaying at least portions of files in the selectable database that meet the search criterion;

indicating terms in the displayed file portions that meet the search criterion;

identifying at least one alias of at least one of the selected terms for which custom linking relationships with designated files are defined;

displaying the at least one alias; and enabling interaction with the at least one alias via at least one input device to enable perusal of linked files in the at least one selectable database.

12. A data indexing and perusal system comprising:

an index module that enables generation of an index of a plurality of selected source files;

a custom link module that enables a user to create links between two of the plurality of selected source files; and a search module that enables a search to be performed according to a search criterion to locate words and phrases in the plurality of selected source files;

wherein the link module enables designation of a link term and designation of one of the plurality of selected source files to be linked to the designated link term; the link module being operable to automatically link multiple instances of the designated link term in the plurality of selected source files with the designated file;

wherein the link module further enables identification of a plurality of alias terms to be associated with the designated link term, the link module being operable to automatically link instances of the alias terms in the plurality of selected source files with the designated file.

13. A data indexing and perusal system, comprising:

an index module that enables generation of an index of a plurality of selected source files;

a custom link module that enables a user to create links between two of the plurality of selected source files; and a search module that enables a search to be performed according to a search criterion to locate words and phrases in the plurality of selected source files;

wherein at least some of the plurality of selected source files have predefined fields containing identification data;

wherein the link module enables designation of a link field pattern, including wild card characters, that correspond to one or more text strings; and the link module being operable to automatically link instances of the one or more text strings in the plurality of selected source files with source files having identification data that match the text strings.

14. A method of linking, indexing, and searching a plurality of selected source files, the method comprising:

enabling users to create custom links between two or more of the plurality of selected source files;

enabling designation of a link term and designation of one of the plurality of selected source files to be linked to the designated link term;

automatically generating links between all instances of the link term within the plurality of selected source files and the designated file;

enabling identification of a plurality of alias terms to be associated with the designated link term; automatically generating links between all instances of the alias terms in the plurality of selected source files and the designated file;

generating a searchable index of the plurality of selected source files;

incorporating any user-created custom links into the index; and searching the searchable index according to a search criterion to locate words and phrases in the plurality of selected source files.

15. A method of linking indexing, and searching a plurality of selected source files, the method comprising:

enabling users to create custom links between two or more of the plurality of selected source files, wherein at least some of the plurality of selected source files have predetermined fields containing identification data;

enabling designation of a link term and designation of one of the plurality of selected source files to be linked to the designated link term;

automatically generating links between all instances of the link term within the plurality of selected source files and the designated file;

enabling designation of a link field pattern, including wild card characters, that correspond to one or more text strings;

automatically linking instances of the one or more text strings in the plurality of selected source files with source files having identification data that match the text strings;

generating a searchable index of the plurality of selected source files;

incorporating any user-created custom links into the index; and searching the searchable index according to a search criterion to locate words and phrases in the plurality of selected source files.

* * * * *

UNITED STATES PATENT AND TRADEMARK OFFICE
CERTIFICATE OF CORRECTION

PATENT NO. : 6,834,276 B1
APPLICATION NO. : 09/257714
DATED : December 21, 2004
INVENTOR(S) : Robert Leland Jensen et al.

It is certified that error appears in the above-identified patent and that said Letters Patent is hereby corrected as shown below:

On the Title Page
Item (56)
Please add the following:
U.S. Patent Documents -
5,744,123  06/30/1998  Matson
4,815,029  03/21/1989  Barker et al.
5,754,840  05/19/1998  Rivette et al.
5,752,244  05/12/1998  Rise et al.
5,752,242  05/12/1998  Havens
5,742,816  04/21/1998  Barr et al.
5,797,619  04/07/1998  Judson
5,721,908  02/24/1998  Lagarde et al.
5,717,913  02/10/1998  Driscoll
5,706,502  01/06/1998  Foley
5,687,367  11/11/1997  Dockter et al.
5,557,722  09/17/1996  DeRose et al.
5,659,742  08/19/1997  Beattie et al.
5,652,880  07/29/1997  Seagraves
5,537,586  07/16/1996  Amram et al.
5,649,186  07/15/1997  Ferguson
5,535,382  07/09/1996  Ogawa
5,519,865  05/21/1996  Kondo et al.
5,455,945  10/03/1995  VanderDrift
5,466,891  08/29/1995  Kaplan et al.
5,251,294  10/05/1993  Abelow
5,367,621  11/22/1994  Cohen et al.
5,297,249  03/22/1994  Bernstein et al.
5,222,234  06/22/1993  Wang et al.
5,201,046  04/06/1993  Goldberg et al.

Signed and Sealed this

Thirtieth Day of November, 2010

David J. Kappos
*Director of the United States Patent and Trademark Office*

CERTIFICATE OF CORRECTION (continued)
U.S. Pat. No. 6,834,276 B1

On the Title Page
Please add the following:
Other publications - Item (56)
C. Mic Bowman, Peter B. Danzig, Darren R. Hardy, Udi Manber, Michael F. Schwartz, The Harvest Information Discovery and Access System, 119-125 Computer Networks and ISDN Systems (1995)

Christian Neuss and Robert E. Kent, Conceptual Analysis of Resource Meta-lnformation, 973-984, Computer Networks and ISDN Systems (1995)

S.A. Dobson and V.A. Burrill, Lightweight Databases; 1009-1015, Computer Networks and ISDN Systems (1995)

Yoelle S. Maarek and Israel Z. Ben Shaul, Automatically Organizing Bookmarks Per Contents, 1321-1333, Computer Networks and ISDN Systems (1996)

Fred Douglis, Thomas Ball, Yih-Farn Chen, Eleftheriof Koutsofios, WebGUIDE: Querying and Navigating Changes in Web Repositories, 1335-1344, Computer Networks and ISDN Systems (1996)

K.J. Maly, A. Gupta, B. Kvande, et al. A Privilege Management and Enforcement System for Distributed Resource Sharing, 106-111, 5th Workshops on Enabling Technologies: Infrastructure for Collaborative Enterprises (June 1996)

Laks V. S. Lakshmanan, Fereidoon Sadri, Iyer N. Subramanian, A Declarative Language for Querying Restructuring the Web, 12-21, Sixth International Workshop on Research Issues in Data Engineering (February 1996)

K. Voigt, Skipper, A Tool that Lets Browsers Adapt to Changes in Document Relevance to Its User, 61-68, Sixth International Workshop on Research Issues in Data Engineering (February 1996)

Michael R. Genesereth, Arther M. Keller, Oliver M. Duschka, Infomaster: An Information Integration System, 539-542, SIGMOD Record (May 1997)

Naveen Ashish and Craig A. Knoblock, Wrapper Generation for Semi-tructured Internet Source, 8-15, SIGMOD Record, Vol. 26, No. 4 (December 1997)

Paolo Atzeni, Giansaalvatore Mecca, Paolo Merialdo, Semistructured and Structured Data in the Web, Going Back and Forth, 16-23, SIGMOD Record, Vol. 26, No. 4 (December 1997)

Jason McHugh and Jennifer Widom, Integrated Dynamically-Fetched External Information into a DBMS for Semistructured Data, 24-31, SIGMOD Record, Vol. 26, No. 4 (December 1997)

Robert A. Nado and Scott B. Huffman, Extracting Entity Profiles from Semistructured Information Spaces, 32-38, SIGMOD Record, Vol. 26, No. 4 (December 1997)

Svetlozar Nestorov, Serge Abiteboul and Rajeev Motwani, Inferring Structure in Semistructured Data, 39-43, SIGMOD Record, Vol. 26, No. 4 (December 1997)

UNITED STATES PATENT AND TRADEMARK OFFICE
CERTIFICATE OF CORRECTION

PATENT NO.        : 6,834,276 B1
APPLICATION NO.   : 09/257714
DATED             : December 21, 2004
INVENTOR(S)       : Robert Leland Jensen et al.

Page 1 of 3

It is certified that error appears in the above-identified patent and that said Letters Patent is hereby corrected as shown below:

On the Title Page,
Item (56)
Please add the following:
U.S. Patent Documents-
5,852,820 12/22/1998 Burrows Item (56)
U.S. Patent Documents-
"5,744,123" should read -- 5,774,123 --

Please replace the following drawing:
Delete Figure 1C and replace with attached Figure 1C Column 9
Line 21, "filed" should read -- files --
Line 64, "connection" should read -- communication --

Column 10
Line 5, "from word" should read -- from a word --
Line 43, "includes" should read -- include --
Line 56, "The incompatibilities and" should read -- The incompatibilities --
Line 57, "several type" should read -- several types --

Column 12
Line 3, "and the keyboard interface 116" should read -- and the keyboard interface 117 --
Line 37, "provides a static and enables a snapshot" should read -- is static in that it enables a snapshot --

Signed and Sealed this

Seventeenth Day of January, 2012

David J. Kappos
*Director of the United States Patent and Trademark Office*

Column 13
Line 3, "terms of a It" should read -- terms of a --
Line 67, "as a long is integer" should read -- as a long integer --

Column 16
Line 8, "sole contents" should read -- sole content --

Column 18
Line 21, "bin that" should read -- in that --

Column 22
Line 18, "content stable" should read -- contents table --
Line 26, "files th at have" should read -- files that have --

Column 26
Line 61, "With" should be -- with --